(12) United States Patent
Murakami

(10) Patent No.: US 12,170,949 B2
(45) Date of Patent: Dec. 17, 2024

(54) COMMUNICATION DEVICE AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 346 days.

(21) Appl. No.: 17/639,566

(22) PCT Filed: Jul. 21, 2020

(86) PCT No.: PCT/JP2020/028189
§ 371 (c)(1),
(2) Date: Mar. 1, 2022

(87) PCT Pub. No.: WO2021/044753
PCT Pub. Date: Mar. 11, 2021

(65) Prior Publication Data
US 2022/0417832 A1  Dec. 29, 2022

(30) Foreign Application Priority Data
Sep. 6, 2019  (JP) .................... 2019-162963

(51) Int. Cl.
*H04W 48/10* (2009.01)
*H04L 5/00* (2006.01)
*H04W 72/0453* (2023.01)
*H04W 72/27* (2023.01)

(52) U.S. Cl.
CPC ........... *H04W 48/10* (2013.01); *H04L 5/0048* (2013.01); *H04W 72/0453* (2013.01); *H04W 72/27* (2023.01)

(58) Field of Classification Search
None
See application file for complete search history.

(56) References Cited

U.S. PATENT DOCUMENTS

| 10,938,644 B2 * | 3/2021 | Xiao ...................... H04W 88/08 |
| 2016/0309393 A1 * | 10/2016 | Amini ................. H04W 40/244 |
| 2018/0332586 A1 | 11/2018 | Takeuchi |
| 2021/0014911 A1 * | 1/2021 | Patil ...................... H04W 48/08 |

FOREIGN PATENT DOCUMENTS

| JP | 2018-195886 A | 12/2018 |
| JP | 2019-4354 A | 1/2019 |

OTHER PUBLICATIONS

Abouelseoud et al., Sony, "Discovery Assistance for 802.11ay," IEEE 802.11-18/0816r1, May 8, 2018 (20 pages).
Cariou et al., Intel, "6 GHz—Out-of-band discovery discussion," IEEE 802.11-18/1960r0, Nov. 11, 2018 (15 pages).
(Continued)

*Primary Examiner* — Xavier S Wong
(74) *Attorney, Agent, or Firm* — Seed IP Law Group LLP

(57) ABSTRACT

This communication device comprises: a control unit that sets information relating to multiband and/or multichannel communication in an extended field of a beacon signal; and a communication unit that transmits the beacon signal.

8 Claims, 28 Drawing Sheets

(56) References Cited

OTHER PUBLICATIONS

International Search Report, mailed Oct. 27, 2020, for International Application No. PCT/JP2020/028189 (5 pages including translation).
LAN/MAN Standards Committee, "IEEE P802.11-REVmdTM/D1.0, Draft Standard for Information technology—Telecommunications and information exchange between systems, Local and metropolitan area networks—Specific requirements, Part 11: Wireless LAN Medium Access Control (MAC) and Physical Layer (PHY) Specifications," IEEE Computer Society, Feb. 2018 (4226 pages).

* cited by examiner

COMMUNICATION DEVICE AND COMMUNICATION METHOD

TECHNICAL FIELD

The present disclosure relates to a communication apparatus and a communication method.

BACKGROUND ART

Patent Literature (hereinafter, referred to as "PTL") 1 discloses an information processing apparatus that appropriately executes a process of connecting a communication apparatus capable of using a plurality of frequency bands (e.g., 2.4 GHz and 5 GHz) and an external apparatus.

CITATION LIST

Patent Literature

PTL 1
Japanese Patent Application Laid-Open No. 2018-195886

Non-Patent Literature

NPL 1
IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications IEEE P802.11-REVmd/D1.0, February 2018

SUMMARY OF INVENTION

Technical Problem

Institute of Electrical and Electronics Engineers (IEEE) has been having a discussion on multiple bands and multiple channels in a wireless Local Area Network (LAN).

However, no concrete specifications for operating at least one of multiple bands and multiple channels has been developed.

One non-limiting and exemplary embodiment facilitates providing a communication apparatus, a terminal, and a communication method enabling operation of at least one of the multiple bands and the multiple channels.

Solution to Problem

A communication apparatus according to an exemplary embodiment of the present disclosure includes: a controller that configures information on at least one of multiple bands and multiple channels in an extension field of a beacon signal; and a communicator that transmits the beacon signal.

A communication apparatus according to an exemplary embodiment of the present disclosure includes: a communicator that receives a beacon signal in which information on at least one of multiple bands and multiple channels is configured in an extension field of the beacon signal; and a controller that performs communication based on the information, the communication being based on the at least one of the multiple bands and the multiple channels.

A communication method for a communication apparatus according to an exemplary embodiment of the present disclosure includes: configuring information on at least one of multiple hands and multiple channels in an extension field of a beacon signal; and transmitting the beacon signal.

A communication method for a communication apparatus according to an exemplary embodiment of the present disclosure includes: receiving a beacon signal in which information on at least one of multiple bands and multiple channels is configured in an extension field of the beacon signal; and performing communication based on the information, the communication being based on the at least one of the multiple bands and the multiple channels.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

Advantageous Effects of Invention

According to one exemplary embodiment of the present disclosure, it is possible to operate at least one of multiple bands and multiple channels.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Embodiments of the present disclosure will be described in detail below with appropriate reference to the accompanying drawings. However, any unnecessarily detailed description may be omitted. For example, any detailed description of well-known matters and redundant descriptions on substantially the same configurations may be omitted. This is to avoid the unnecessary redundancy of the following description and to facilitate understanding by those skilled in the art.

It is to be noted that the accompanying drawings and the following description are provided to enable those skilled in the art to fully understand this disclosure, and are not intended to limit the claimed subject.

Embodiment 1

A Service Set Identifier (SSID) of a wireless LAN may be different between the 2.4 GHz band and the 5 GHz band, but may be the same (common) in the case of band steering. Also, Media Access Control (MAC) addresses of access points may be different between the 2.4 GHz band and the 5 GHz band, but may be the same (common) in the case of band steering.

In a dual band operation, for example, in the 2.4 GHz band and 5 GHz band using band steering, a terminal supporting, for example, the 5 GHz band is detected, and the detected client is guided to the 5 GHz band. This guidance makes, for example, the congested 2.4 GHz band available for a legacy terminal. In particular, in a highly congested environment with terminals, the above-described guidance can reduce the usage rate of channels and improve the end-user experience. However, in the dual-band operation using band steering, the terminal may be guided to the 2.4 GHz band when there is room in the 2.4 GHz band.

Figure 1:
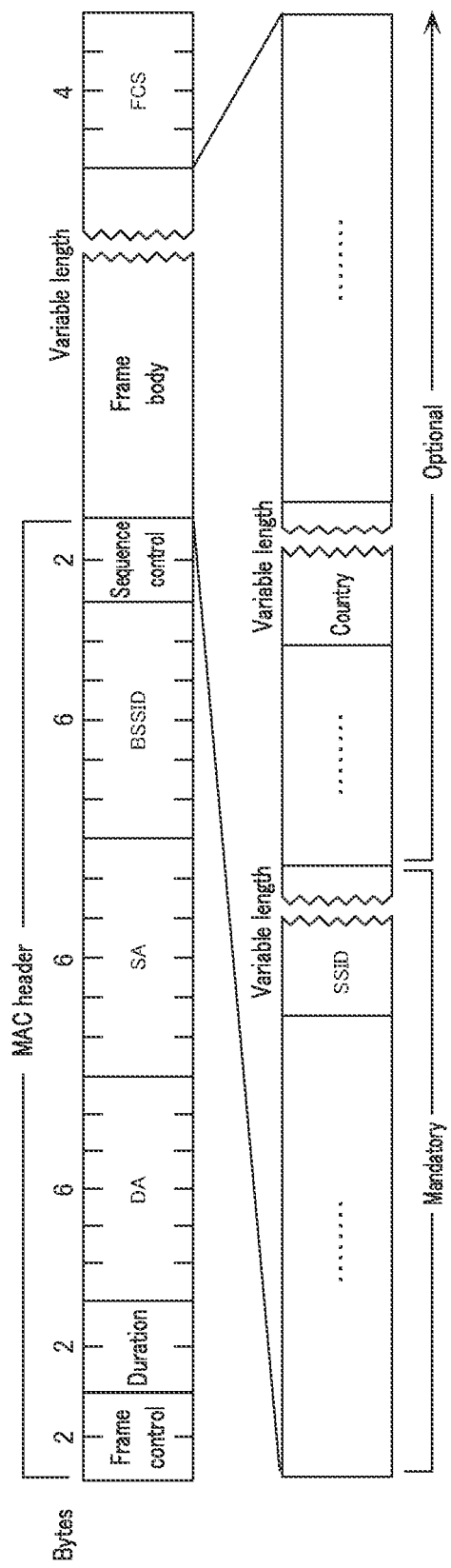
FIG. 1 illustrates an exemplary configuration of a beacon frame.

FIG. 1 illustrates an exemplary configuration of a beacon frame. The numerical values in FIG. 1 indicate the data lengths of the fields described below. The unit is byte. The beacon frame includes, for example, the following fields.

2-byte frame control (field)
2-byte duration (field)
6-byte Destination Address (DA) (field)
6-byte Source Address (SA) (field)
6-byte BSSID (field)
9 2-byte sequence control (field)

These fields make up a MAC header. In addition, the beacon frame also includes a variable-length frame body (field). The frame body includes, for example, the following fields.

Variable-length SSID (field)
Variable-length country (field)

The variable-length frame body includes various information (fields) in addition to the SSID (field) and the country (field), but illustration of such information is omitted in FIG. 1.

Generally, a Basic Service Set identifier (BSSID) of an access point (hereinafter, also referred to as "AP") is configured in "BSSID" of the beacon frame transmitted by the AP. The SSID of the AP is configured in "SSID." Since the beacon frame is broadcast, "DA" is configured to all 1 s. The MAC address of the AP is configured in the fields "SA" and "BSSID."

When band steering is introduced into radio communication systems of the wireless LAN, the same SSID is configured, for example, for the AP between the 2.4 GHz band and the 5 GHz band. An SSID for band steering is registered in a terminal capable of performing band steering.

The AP transmits a beacon in a frequency band to which a terminal is to be guided. The terminal operates a communicator that transmits and receives radio signals in the 2.4 GHz band and a communicator that transmits and receives radio signals in the 5 GHz band, and communicates with the AP using one of the communicators which obtains the SSID. Accordingly, the terminal communicates with the AP in the frequency band to which the terminal is guided by the AP.

For example, the AP broadcasts a 5 GHz band beacon when guiding the terminal to the 5 GHz band. In the terminal, the communicator for the 5 GHz band receives the beacon, and the terminal communicates by radio with the AP in the 5 GHz band. Accordingly, the terminal communicates with the AP in the 5 GHz band to which the terminal is guided by the AP.

For example, in order to improve a data transmission rate in the wireless LAN, a radio communication system enabling the band steering and operation of the multiple bands/multiple channels (at least one of the multiple bands and the multiple channels) is desired. Embodiment 1 provides a wireless LAN communication system enabling the band steering and operation of the multiple bands multiple channels.

Figure 2:
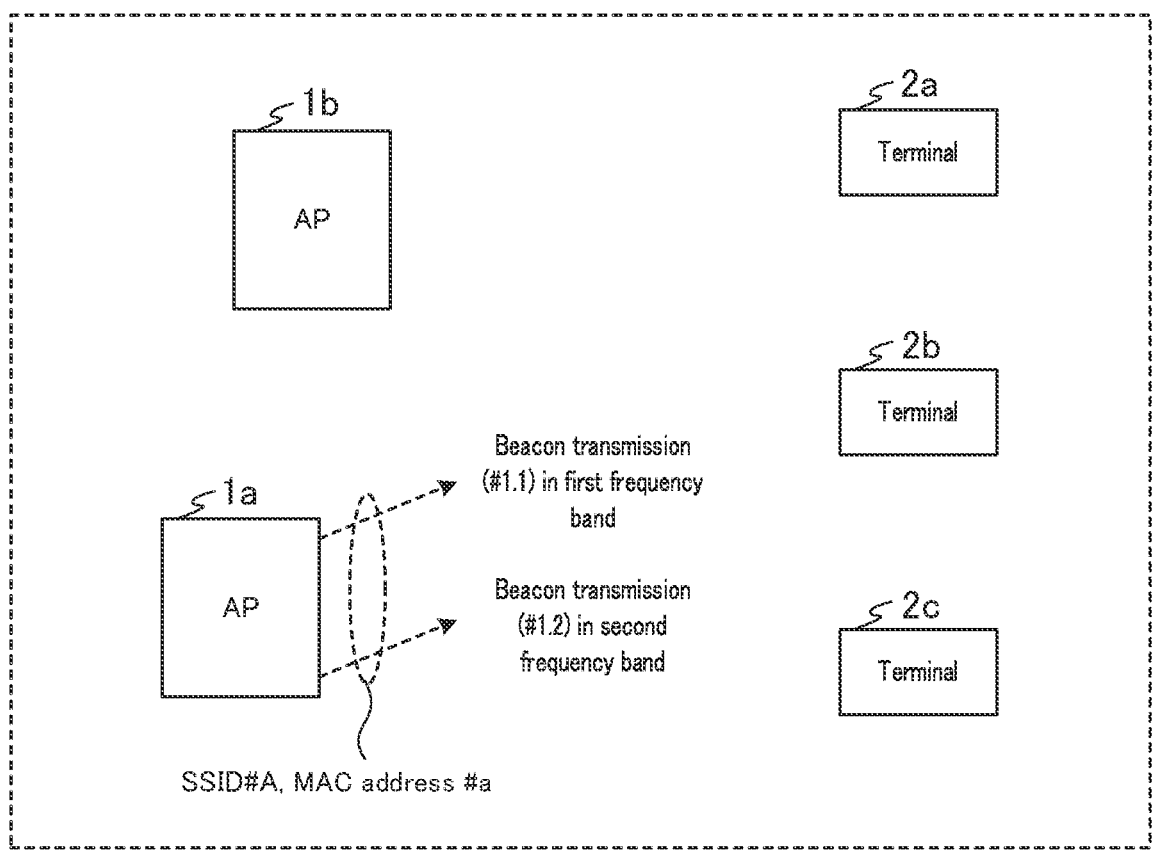
FIG. 2 illustrates an exemplary configuration of a radio communication system according to Embodiment 1.

FIG. 2 illustrates an exemplary configuration of a radio communication system according to Embodiment 1. As illustrated in FIG. 2, the radio communication system includes APs 1a and 1b and terminals 2a to 2c. The radio communication system performs radio communication based on communication standards for wireless LANs.

AP 1a is an AP that is capable of performing the band steering and operation of the multiple bands/multiple channels. Terminals 2a to 2c are terminals capable of performing the band steering and operation of the multiple bands/multiple channels.

Hereinafter, a beacon in a first frequency band transmitted by AP 1a may be referred to as beacon #1.1. A beacon in a second frequency band transmitted by AP 1a may be referred to as beacon #1.2.

In the radio communication system of FIG. 2, an SSID of beacon #1.1 and an SSID of beacon #1.2 are set the same in order to perform band steering. For example, the SSID of beacon #1.1 and the SSID of beacon #1.2 are configured to SSID #A.

Further, in the radio communication system of FIG. 2, the SA of beacon #1.1 and the SA of beacon #1.2 are set the same in order to perform band steering. That is, the MAC address (BSSID) for beacon #1.1 and the MAC address (BSSID) for beacon #1.2 are set the same. For example, MAC address #a is configured for the SA of beacon #1.1 and the SA of beacon #1.2.

Each of terminals 2a to 2c includes a communicator that communicates by radio in the first frequency band and a communicator that communicates by radio in the second frequency band. Each of terminals 2a to 2c operates the communicator in the first frequency band and the communicator in the second frequency band, to communicate with the AP using one of the communicators which has obtained SSID #A and MAC address #a. That is, terminals 2a to 2c do not distinguish between (are unaware of) the first frequency band and the second frequency band, and obtain SSID #A and MAC address #a to grasp the presence of AP 1a. Thus, the terminals can achieve band steering.

Note that the present disclosure specifies a method for operating the multiple bands/multiple channels, but does not particularly specify which of the first frequency band and the second frequency band terminals 2a to 2c are guided to (whether the terminals perform band steering).

In the radio communication system of FIG. 2, the band steering is operated and the multiple bands multiple channels are operated. To this end, the radio communication system operates the multiple bands/multiple channels under the condition that the SSID of beacon #1.1 and the SSID of beacon #1.2 are configured the same, and the SA of beacon #1.1 and the SA of beacon #1.2 are configured the same. That is, in the radio communication system of FIG. 2, the multiple hands/multiple channels are operated under the condition that the band steering can be operated.

In order to operate the multiple bands/multiple channels under conditions in which band steering can be performed, AP 1a configures information on multi-band/multi-channel communication in, for example, an extension field of a beacon frame. That is, the beacon frame is provided with the extension field that contains the information on the multi-band/multi-channel communication.

However, this is an example, and the information on the multi-band/multi-channel communication does not have to be configured in the extension field of the beacon frame, but the information on the multi-band/multi-channel communication may be configured in another field. In addition, although referred to here as the information on the multi-band/multi-channel communication, the name is not limited to this. Information included in the information on the multi-band/multi-channel communication matters. Further, the information on the multi-band/multi-channel communication may include only information on multi-hand communication or only information on multi-channel communication. In this case, the information on the multi-band/multi-channel communication may be referred to as the information on multi-band communication or the information on multi-channel communication.

In the following, the extension field provided in the beacon frame may be referred to as a Multi-band Multi-channel (MBMC) field. The MBMC field may have a fixed or variable length.

Figure 3A:
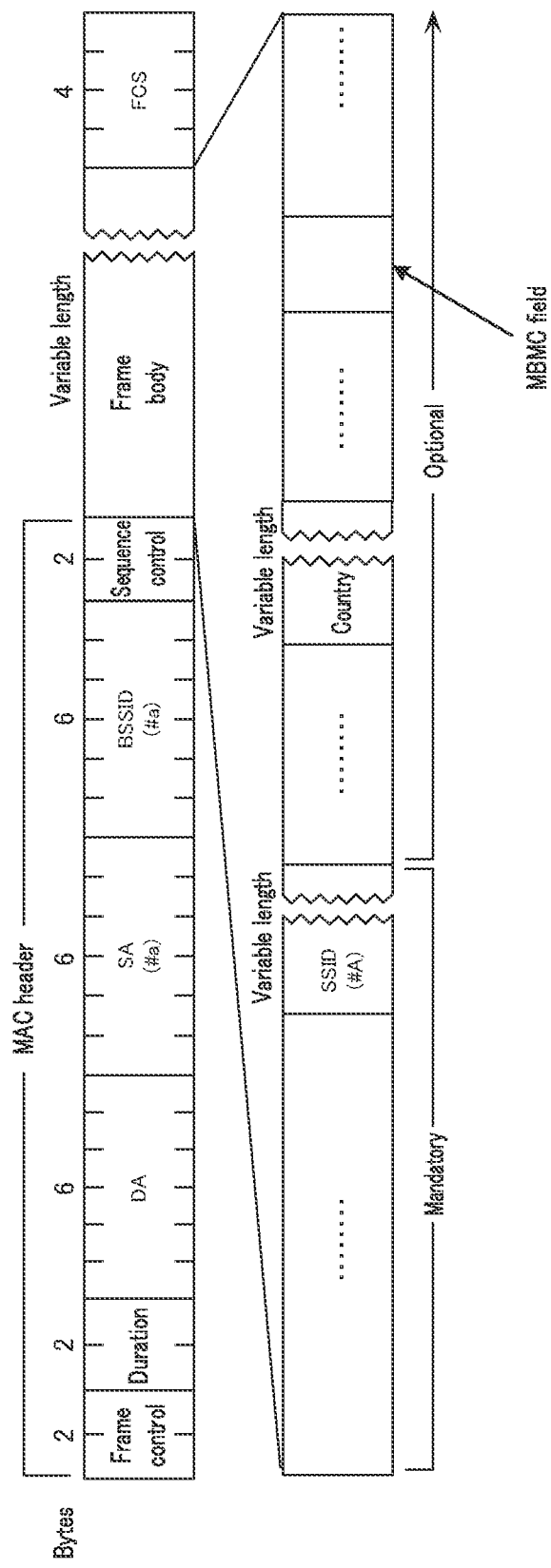
FIG. 3A illustrates an exemplary configuration of the beacon frame.
Figure 3B:
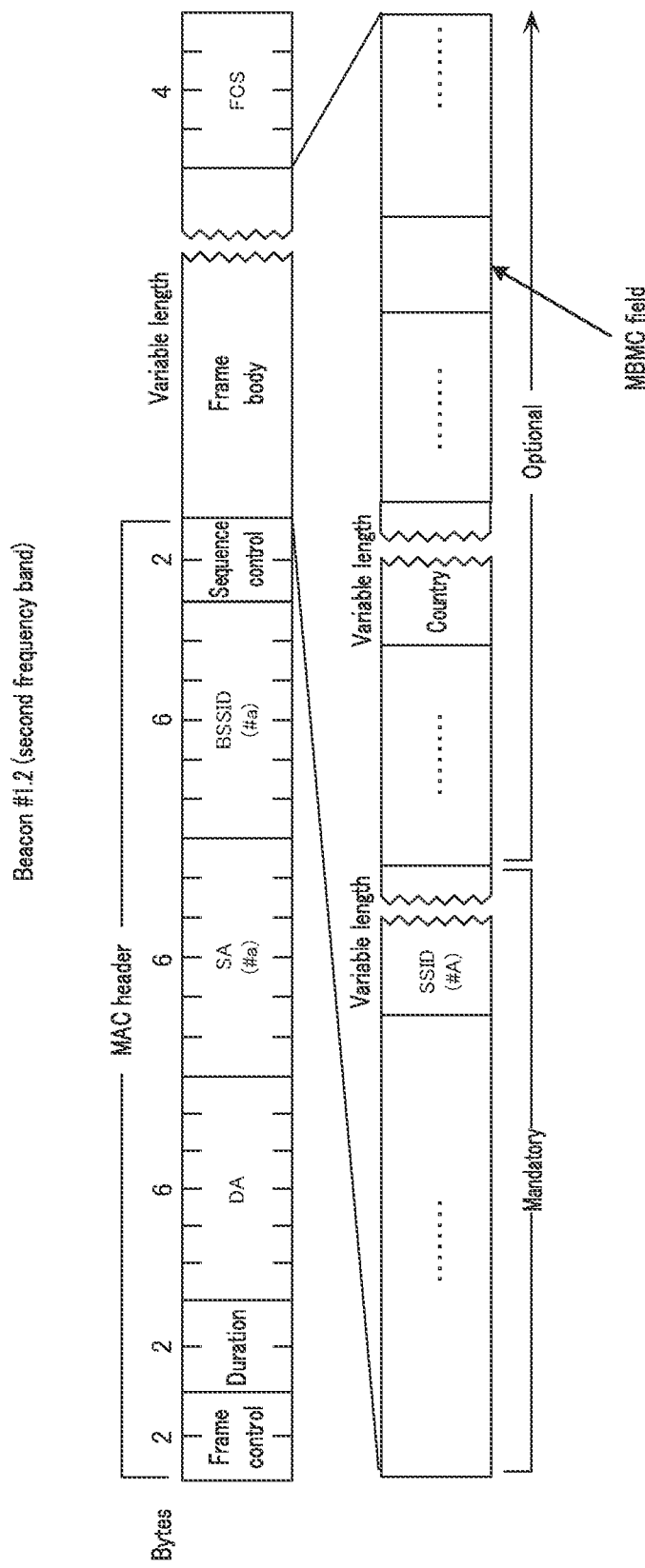
FIG. 3B illustrates an exemplary configuration of the beacon frame.

FIG. 3A illustrates an exemplary configuration of a beacon frame of beacon #1.1. FIG. 3B illustrates an exemplary configuration of a beacon frame of beacon #1.2. As illustrated in FIGS. 3A and 3B, the SA, BSSID, and SSID of beacon #1.1 are the same as the SA, BSSID, and SSID of beacon #1.2.

As illustrated in FIGS. 3A and 3B, the MBMC field is provided in "Optional" in the beacon frame of each of beacons #1.1 and #1.2. The MBMC field contains, for example, information on whether or not the multiple bands/multiple channels are available. The MBMC field only has to be disposed in the optional part of the beacon frame, for example, and is not limited to the position illustrated in FIGS. 3A and 3B. As described above, the MBMC field only has to be included in the beacon frame.

The MBMC field contains, for example, information indicating whether or not AP 1a is multi-band capable (supports multiple bands). For example, AP 1a is an AP supporting multiple bands. In this case, the MBMC field of the beacon frame contains information indicating that AP 1a is multi-band capable.

Upon receiving beacon #1.1 and beacon #1.2, a terminal supporting multiple bands/multiple channels refers to the MBMC fields of beacon #1.1 and beacon #1.2. The terminal supporting multiple bands/multiple channels distinguishes between the SSID of beacon #1.1 and the SSID of beacon #1.2 when the MBMC fields contain the information indicating that AP 1a is the AP supporting multiple bands.

That is, the terminal supporting multiple hands/multiple channels distinguishes between beacon #1.1 in the first frequency band and beacon #1.2 in the second frequency band based on the information in the MBMC field. Thus, the terminal supporting multiple bands/multiple channels can perform multi-band-based communication based on the first frequency band of beacon #1.1 and the second frequency band of beacon #1.2.

In addition, the MBMC field contains, for example, information indicating whether or not AP 1a is multi-channel capable (supports multiple channels). For example, AP 1a is an AP supporting multiple channels. In this case, the MBMC field of the beacon frame contains information indicating that AP 1a is multi-channel capable.

Upon receiving beacon #1.1 and beacon #1.2, the terminal supporting multiple bands/multiple channels refers to the MBMC fields of beacon #1.1 and beacon #1.2. The terminal supporting multiple bands/multiple channels distinguishes between the SSID of beacon #1.1 and the SSID of beacon #1.2 when the MBMC fields contain information indicating that AP 1a is the AP supporting multiple channels.

That is, the terminal supporting multiple hands/multiple channels distinguishes between beacon #1.1 in the first frequency band and beacon #1.2 in the second frequency band based on the information in the MBMC fields. Thus, the terminal supporting multiple bands/multiple channels is capable of performing the multi-channel communication in the first frequency band or the multi-channel communication in the second frequency band or both of them based on beacon #1.1 in the first frequency band and beacon #1.2 in the second frequency band.

Legacy terminals do not refer to the MBMC fields of beacon #1.1 and beacon #1.2. The legacy terminals communicate with AP 1a using the frequency band of the beacon corresponding to obtained one of the SSID of beacon #1.1 in the first frequency band and the SSID of beacon #1.2 in the second frequency band.

The multi-band communication may be defined as follows.

A first communication apparatus (e.g., a terminal) may simultaneously receive a plurality of modulated signals transmitted by one or more communication apparatuses (e.g., access points (APs) or base stations) that are communication partners. Note that, modulated signals in a plurality of frequency bands (e.g., 5 GHz band and 6 GHz band) are present among these modulated signals.

Note that the first communication apparatus may simultaneously communicate with one or more communication apparatuses being the communication partners using a plurality of frequency bands.

Figure 4:
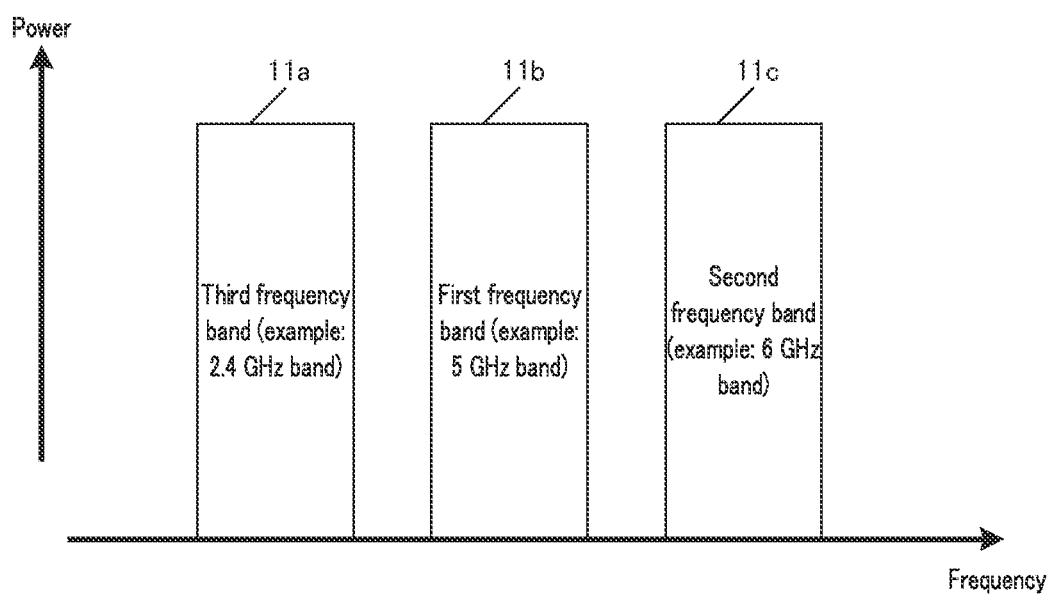
FIG. 4 illustrates an example of a modulated signal.

FIG. 4 illustrates an example of a modulated signal. FIG. 4 illustrates modulated signal 11a in the first frequency band, modulated signal 11b in the second frequency band, and modulated signal 11c in a third frequency band. The first frequency band is, for example, the 5 GHz band. The second frequency band is, for example, the 6 GHz band. The third frequency band is, for example, the 2.4 GHz band.

When applying the multi-band communication, a terminal may receive modulated signals 11a to 11c in a plurality of frequency bands from an AP simultaneously. For example, the terminal may receive the modulated signals in any two or more frequency bands of the 5 GHz band, 6 GHz band, and 2.4 GHz band from the AP simultaneously.

The multi-channel communication may be defined as follows.

A first communication apparatus (e.g., a terminal) may simultaneously receive a plurality of modulated signals transmitted by one or more communication apparatuses (e.g., access points (APs) or base stations) that are communication partners. Note that, modulated signals of a plurality of channels of the first frequency band (e.g., a first channel and a second channel of the 5 GHz band) are present among these modulated signals.

Note that the first communication apparatus may simultaneously communicate with one or more communication apparatuses being the communication partners using a plurality of channels of the first frequency band.

Figure 5A:
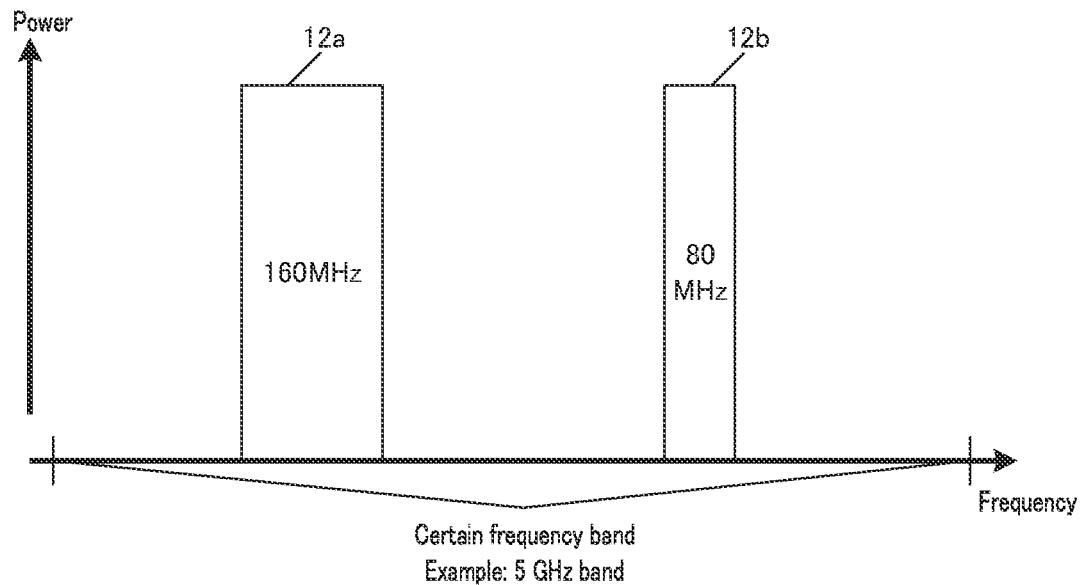
FIG. 5A illustrates an example of the modulated signal.
Figure 5B:
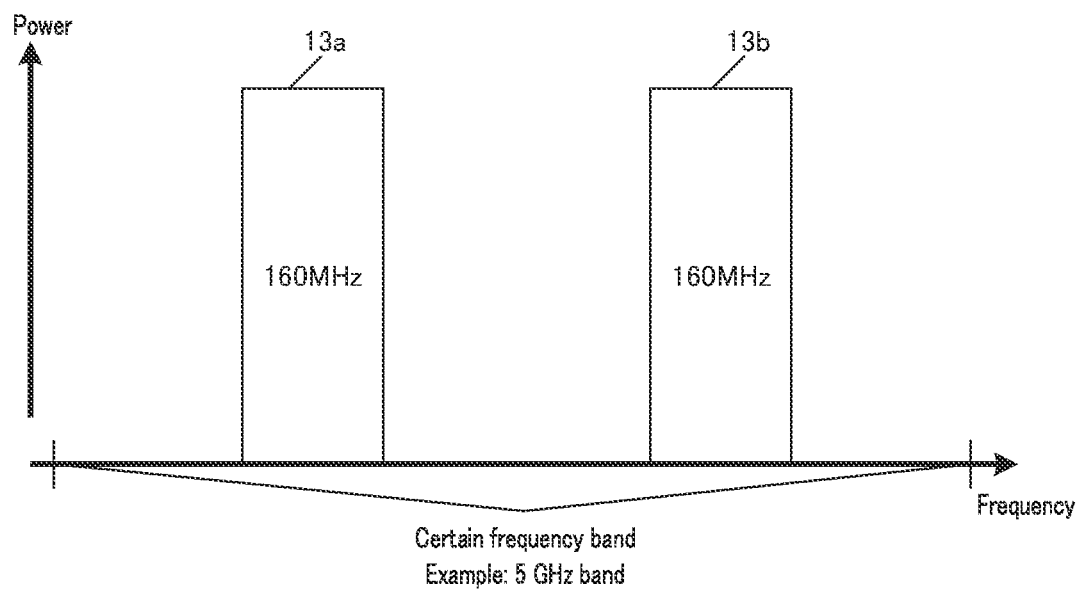
FIG. 5B illustrates an example of the modulated signal.

FIGS. 5A and 5B illustrate examples of modulated signals. FIG. 5A illustrates modulated signal 12a and modulated signal 12b in a certain frequency band. FIG. 5B illustrates modulated signal 13a and modulated signal 13b in the certain frequency band. The certain frequency band is, for example, the 5 GHz band.

When applying the multi-channel communication, a terminal may receive modulation signals in a plurality of channels from an AP simultaneously. For example, the terminal may receive a modulated signal of a first channel and a modulated signal of a second channel in the 5 GHz band simultaneously from the AP. That is, the terminal may receive the modulated signals of a plurality of adjacent channels simultaneously.

In addition, the terminal may also receive, for example, a modulated signal of the first channel and a modulated signal of a fourth channel in the 5 GHz band from the AP simultaneously. That is, the terminal may receive the modulated signals of a plurality of discrete channels from the AP simultaneously.

Note that, the terminal can secure a bandwidth of 240 MHz when simultaneously receiving modulated signal 12a and modulated signal 12b illustrated in FIG. 5A. The terminal can secure a bandwidth of 360 MHz when simultaneously receiving modulated signal 13a and modulated signal 13b illustrated in FIG. 5B.

As described above, the AP configures the information on multi-band/multi-channel communication in the MBMC field of the beacon frame. The AP transmits by radio the beacon frame in which the information is configured. The terminal receives the beacon frame in which the information on the multi-band/multi-channel communication is configured in the MBMC field, The terminal performs the multi-band/multi-channel communication based on the information. It is thus possible to obtain the effect of enabling the AP and the terminal to operate the multiple bands/multiple channels. Note that, in the above description, the case where the terminal performs the multi-channel communication and the case where the terminal performs the multi-band communication are separate from each other, but the terminal may perform the multi-channel communication and the multi-band communication at the same time. Further, taking into account configuration of the MAC address and SSID for the AP, it is possible to obtain the effect of enabling the multi-band/multi-channel communication and band steering.

Modification 1

The MBMC field of a beacon may include information on a frequency band available for multi-band communication. The MBMC field of the beacon may include information on a frequency band available for multi-channel communication.

Figure 6:
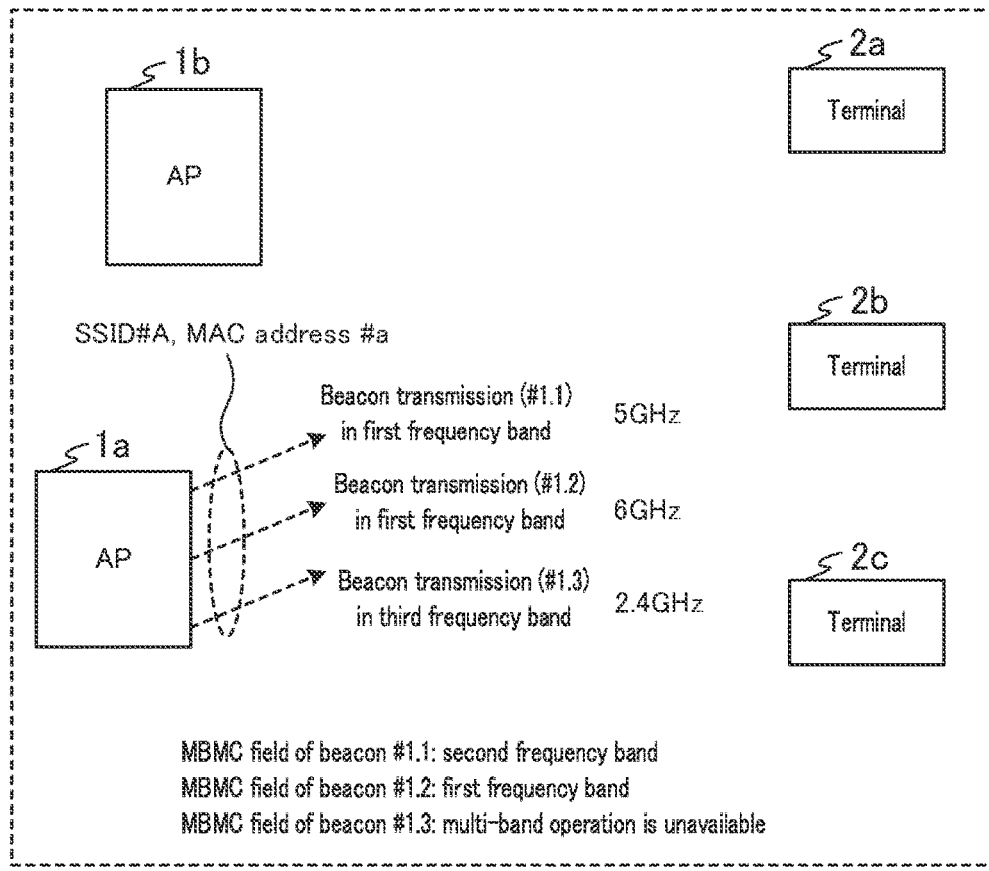
FIG. 6 illustrates an exemplary configuration of a radio communication system according to Modification 1 of Embodiment 1.

FIG. 6 illustrates an exemplary configuration of a radio communication system according to Modification 1 of Embodiment 1. The same elements between FIGS. 2 and 6 are provided with the same reference symbols.

AP 1a in FIG. 6 transmits beacons in a first frequency band, in a second frequency band, and in a third frequency band. The first frequency band is, for example, the 5 GHz band. The second frequency band is, for example, the 6 (kHz band. The third frequency band is, for example, the 2.4 GHz band. Hereinafter, the beacon in the third frequency band may be referred to as beacon #1.3.

In the radio communication system of FIG. 6, in order to perform band steering, the SSID of beacon #1.1, the SSID of beacon #1.2, and the SSID of beacon #1.3 are set the same. For example, the SSID of beacon #1.1, the SSID of beacon #1.2, and the SSID of beacon #1.3 are configured to SSID #A.

In the radio communication system of FIG. 2, in order to perform band steering, the SA of beacon #1.1, the SA of beacon #1.2, and the SA of beacon #1.3 are set the same. That is, the MAC address (BSSID) in beacon #1.1, the MAC address (BSSID) in beacon #1.2. and the MAC address (BSSID) in beacon #1.3 are set the same. For example, MAC address #a is configured for the SA of beacon #1.1, the SA of beacon #1.2, and the SA of beacon #1.3.

AP 1a configures, in the MBMC fields (for example, see FIGS. 3A and 3B) provided in beacons #1.1 to #1.3, the information on the frequency band available for multi-band communication.

For example, AP 1a configures the information on the second frequency band in the MBMC field of beacon #1.1 in the first frequency band. AP 1a configures the information on the first frequency band in the MBMC field of beacon #1.2 in the second frequency band. AP 1a configures, in the MBMC field of beacon #1.3 in the third frequency band, information indicating that the multi-band operation is unavailable. That is, the following information is configured in the MBMC fields of beacons #1.1 to #1.3.

Beacon #1.1: Second frequency band
Beacon #1.2: First frequency band
Beacon #1.3: Multi-band operation is unavailable In this case, terminals 2a to 2c receiving beacon #1.1 in the first frequency band can refer to the MBMC field of beacon #1.1, and can perform multi-band communication using the first frequency band of beacon #1.1 and the second frequency band indicated by the MBMC field, Terminals 2a to 2c receiving beacon #1.2 in the second frequency band can refer to the MBMC field of beacon #1.2, and can perform multi-band communication using the second frequency band of beacon #1.2 and the first frequency band indicated by the MBMC field. Terminals 2a to 2c receiving beacon #1.3 in the third frequency band refer to the MBMC field of beacon #1.3 and judge that the multi-band communication is unavailable. Terminals 2a to 2c receiving beacon #1.3 in the third frequency band communicate with AP 1a using the single third frequency band.

Although it has been described that the information on a frequency band available for multi-band communication is configured in the MBMC field, the information on a frequency band available for multi-channel communication may be configured. For example, the following information may be configured in the MBMC fields of beacons #1.1 to #1.3.

Beacon #1.1: Information indicating whether or not multi-channel communication is possible in the first frequency band
Beacon #1.2: information indicating whether or not multi-channel communication is possible in the second frequency band
Beacon #1.3: Information indicative whether or not multi-channel communication is possible in the third frequency band In Modification 1, the information on one frequency band available for multi-band communication is configured in the MBMC field of one beacon, but the present disclosure is not limited to this. For example, the following information may be configured in the MBMC fields of beacons #1.1 to #1.3.

Beacon #1.1: information on the second frequency band and information on the third frequency band
Beacon #1.2: Information on the first frequency band and information on the third frequency band
Beacon #1.3: Information on the first frequency band and information on the second frequency band In this case, for example, terminals 2a to 2c receiving beacon #1.1 in the first frequency band can perform multi-band communication using the first frequency band, the second frequency band, and the third frequency band. Terminals 2a to 2c receiving beacon #1.2 in the second frequency band can perform multi-band communication using the first frequency band, the second frequency band, and the third frequency band. Terminals 2a to 2c receiving beacon #1.1 in the third frequency band can perform multi-band communication using the first frequency band, the second frequency band, and the third frequency band. That is, information on two or more frequency bands available for multi-band communication may be configured in the MBMC field of one beacon.

In the above example in which the information on two or more frequency bands available for multi-band communication is configured in the MBMC field of one beacon, information on the same third frequency band is configured in the MBMC fields of beacon #1.1 and beacon #1.2 as one of the frequency bands available for multi-band communication. In this case, the first channel may be configured to be used as the third frequency band indicated by the MBMC field of beacon #1.1, and the second channel may be configured to be used as the third frequency band indicated by the MBMC field of beacon #1.2. That is, when the same frequency band is configured as one of the frequency bands available for multi-band communication in the MBMC fields of different beacons, different channels may be configured to be used in the frequency band.

In one MBMC field of a beacon, frequency band information on a frequency band available for multi-band communication and frequency band information on a frequency band available for multi-channel communication may be configured separately. For example, the following information may be configured in the MBMC field of each of beacons #1.1 to #1.3.

"Frequency Band Information on Frequency Band Available for Multi-Band Communication"
Beacon #1.1: Information indicating whether or not the first frequency band can be used in multi-band communication
Beacon #1.2: Information indicating whether or not the second frequency band can be used in multi-band communication
Beacon #1.3: Information indicating whether or not the third frequency band can be used in multi-band communication However, the above information does not have to be included in each of the beacons.

"Frequency Band Information on Frequency Band Available for Multi-Channel Communication"
Beacon #1.1: Information indicating whether or not multi-channel communication is possible in the first frequency band
Beacon #1.2: Information indicating whether or not multi-channel communication is possible in the second frequency band
Beacon #1.3: Information indicating whether or not multi-channel communication is possible in the third frequency band The beacon frame may be provided with two MBMC fields. In one of the MBMC fields, the frequency band information on a frequency band available for multi-band communication may be configured, and in the other one of the MBMC fields, the frequency band information on a frequency band available for multi-channel communication may be configured.

The multi-channel communication may be disabled in the third frequency band. For example, since the number of securable channels is small in the 2.4 GHz band, the multi-channel communication may be disabled in the 2.4 GHz band.

In this case, the information indicating whether or not the multi-channel operation is available does not have to be configured in the MBMC field of beacon #1.3 in the third frequency band. Alternatively, beacon #1.3 in the third frequency band does not have to be provided with any MBMC field. Accordingly, the following frequency band information on a frequency band available for multi-channel communication may be configured in the MBMC fields of beacon #1.1 and beacon #1.2.

"Frequency Band Information on Frequency Band Available for Multi-Channel Communication"

Beacon #1.1: information indicating whether or not the multi-channel operation is available in the first frequency band Beacon #1.2: Information indicating whether or not the multi-channel operation is available in the second frequency band Further, the multi-band communication may be disabled in the third frequency band. For example, since the number of securable channels is small in the 2.4 GHz band, the multi-band communication may be disabled in the 2.4 GHz band.

In this case, the information indicating whether or not the multi-band operation is possible does not have to be configured in the MBMC field of beacon #1.3 in the third frequency band. Alternatively, beacon #1.3 in the third frequency band does not have to be provided with any MBMC field. Accordingly, the following frequency band information on a frequency band available for multi-band communication may be configured in the MBMC fields of beacon #1.1 and beacon #1.2.

"Frequency Band Information on Frequency Band Available for Multi-Band Communication"

Beacon #1.1: Information indicating whether or not the first frequency band can be used in multi-band communication Beacon #1.2: Information indicating whether or not the second frequency band can be used in multi-band communication However, the above information does not have to be included in each beacon.

As described above, the information on a frequency band available for multi-band communication may be configured in the MBMC fields of the beacons. The information on a frequency band available for multi-channel communication may be configured in the MBMC fields of the beacons. It is thus possible to obtain the effect of enabling the communication system composed of the APs and the terminals to perform the multi-band/multi-channel communication. Further, taking into account the configuration of the MAC address and. SSID of the AP, it is possible to obtain the effect of enabling the multi-band/multi-channel communication and band steering.

Note that, the frequency band information on a frequency band available for multi-channel communication may include specific channel information. For example, information on a channel available for multi-channel communication as described below may be configured in the MBMC field of beacon #1.1.

Beacon #1.1: Information indicating whether or not channel ch1 of the first frequency band is available, information indicating whether or not channel ch2 of the first frequency band is available, . . . , and information indicating whether or not channel chn of the first frequency band is available In each of beacon #1.2 and beacon #1.3 as in the example of beacon #1.1 described above, a specific channel available fir multi-channel communication may be configured in the MBMC field.

Modification 2

A description will be given of Modification 2 in relation to a radio communication system in which a plurality of beacons include a beacon having a different SSID.

Figure 7:
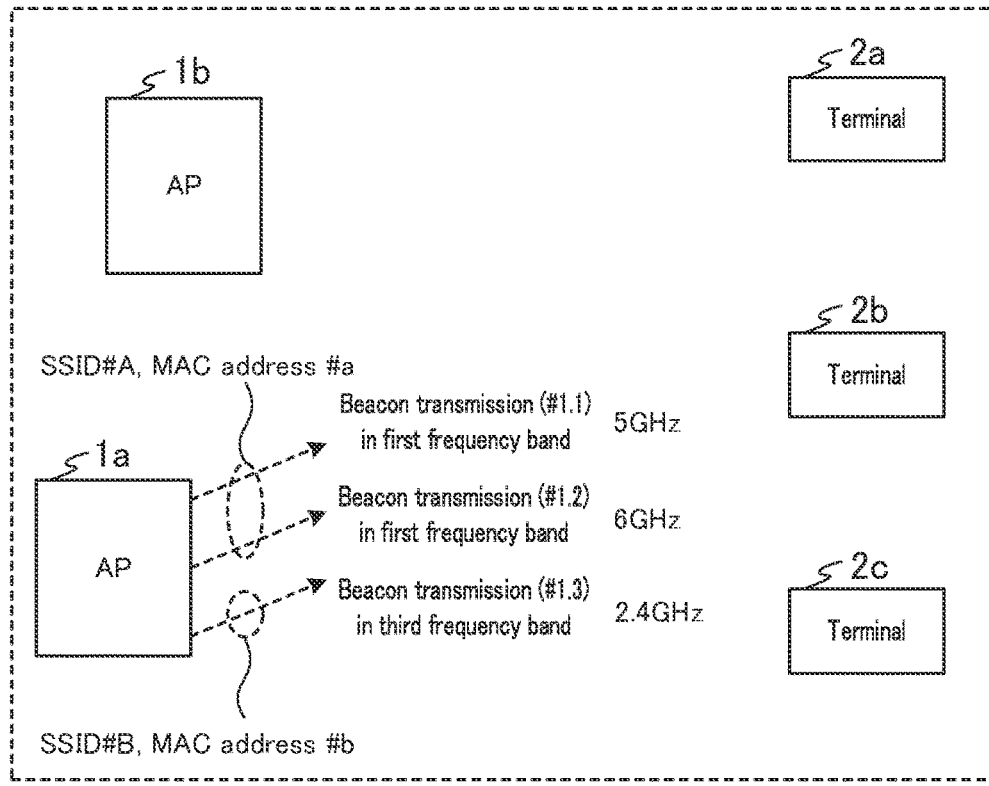
FIG. 7 illustrates an exemplary configuration of a radio communication system according to Modification 2 of Embodiment 1.

FIG. 7 illustrates an exemplary configuration of a radio communication system according to Modification 2 of Embodiment 1. The same elements between FIGS. 2 and 7 are provided with the same reference symbols.

AP 1a in FIG. 7 transmits beacons in a first frequency band, in a second frequency band, and in a third frequency band. The first frequency band is, for example, the 5 GHz band. The second frequency band is, for example, the 6 GHz band. The third frequency band is, for example, the 2.4 GHz band.

In the radio communication system of FIG. 7, in order to perform band steering in the first frequency band and the second frequency band, the SSID of beacon #1.1 and the SSID of beacon #1.2 are set the same.

For example, the SSID of beacon #1.1 and the SSID of beacon #1.2 are configured to SSID #A. SSID #B is configured for the SSID of beacon #1.3 in the third frequency band in which band steering is not performed.

Further, in the radio communication system of FIG. 7, the SA of beacon #1.1 and the SA of beacon #1.2 are set the same in order to perform band steering. That is, the MAC address (BSSID) for beacon #1.1 and the MAC address (BSSID) for beacon #1.2 are set the same.

For example, MAC address #a is configured for the SA of beacon #1.1 and the SA of beacon #1.2. MAC address #b is configured for the SA of beacon #1.3 in the third frequency band in which band steering is not performed.

The beacon frames of beacon #1.1 and beacon #1.2 are provided with the MBMC fields described in Embodiment 1 or Modification 1 of Embodiment 1. Thus, the radio communication system illustrated in FIG. 7 is capable of communication in the first frequency band and the second frequency band based on band steering or multiple bands/multiple channels.

Note that, when obtaining the SSID of beacon #1.3 in the third frequency band, terminals 2a to 2c communicate with AP 1a using the single third frequency band.

Embodiment 2

In Embodiment 2, operation of the multiple bands/multiple channels is enabled even when band steering is not performed.

Figure 8:
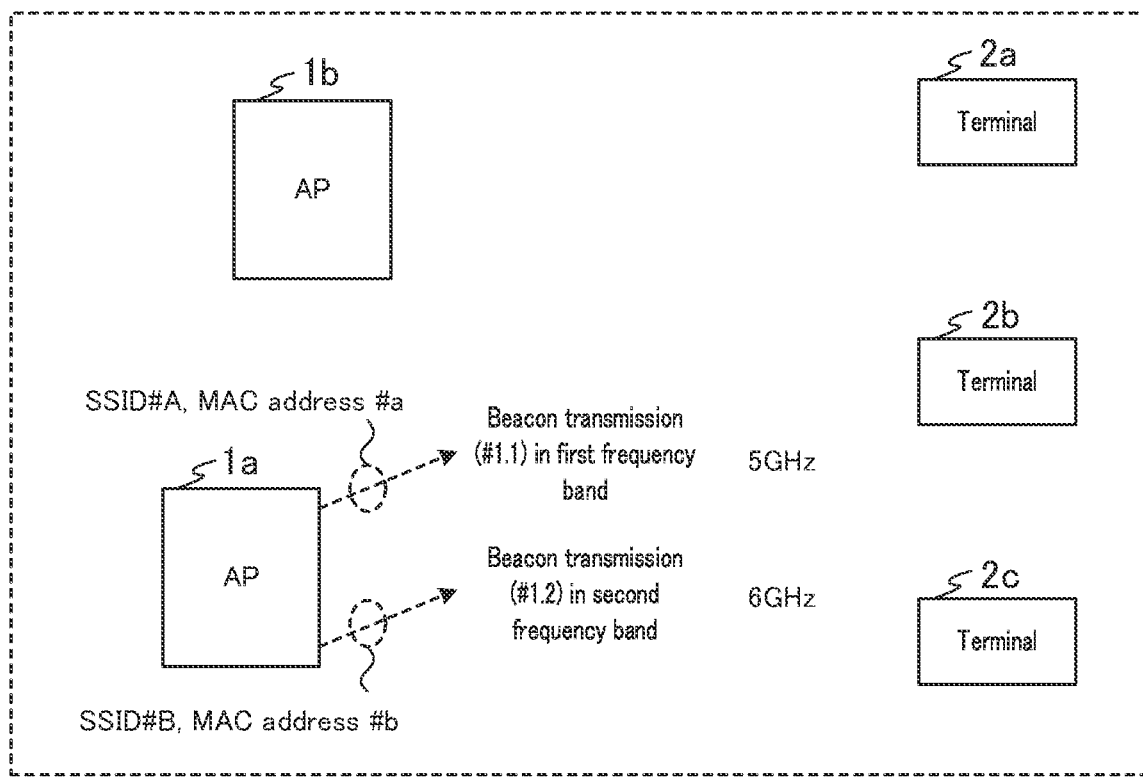
FIG. 8 illustrates an exemplary configuration of a radio communication system of a wireless LAN according to Embodiment 2.

FIG. 8 illustrates an exemplary configuration of a radio communication system of a wireless LAN according to Embodiment 2. The same elements between FIGS. 2 and 8 are provided with the same reference symbols.

AP 1a in FIG. 8 transmits beacons in a first frequency band and a second frequency band. The first frequency band is, for example, the 5 GHz band. The second frequency band is, for example, the 6 GHz band.

In the radio communication system of FIG. 8, band steering is not performed in the first frequency band and the second frequency hand. Thus, the SSID of beacon #1.1 and the SSID of beacon #1.2 are different from each other. For example, the SSID of beacon #1.1 is configured to SSID #A, and the SSID of beacon #1.2 is configured to SSID #B.

The MAC address (BSSID) of AP 1a in the first frequency band may be the same as or different from the MAC address (BSSID) of AP 1a in the second frequency band. In the following, a description will be given in relation to an example where the MAC addresses are different from each other, For example, MAC address #a is configured for the SA of beacon #1.1, and MAC address #b is configured for the SA of beacon #1.2.

In order to operate the multiple hands/multiple channels under conditions in which band steering is not performed, AP 1a configures an SSID for multi-band/multi-channel capability in an extension field of a beacon frame. That is, the beacon frame is provided with a field for configuring (describing) the SSID for multi-band/multi-channel capability. By way of example, this field is an extension field.

In the following, the extension field is also referred to as "MBMC field." The MBMC field may have a fixed or variable length.

Figure 9A:
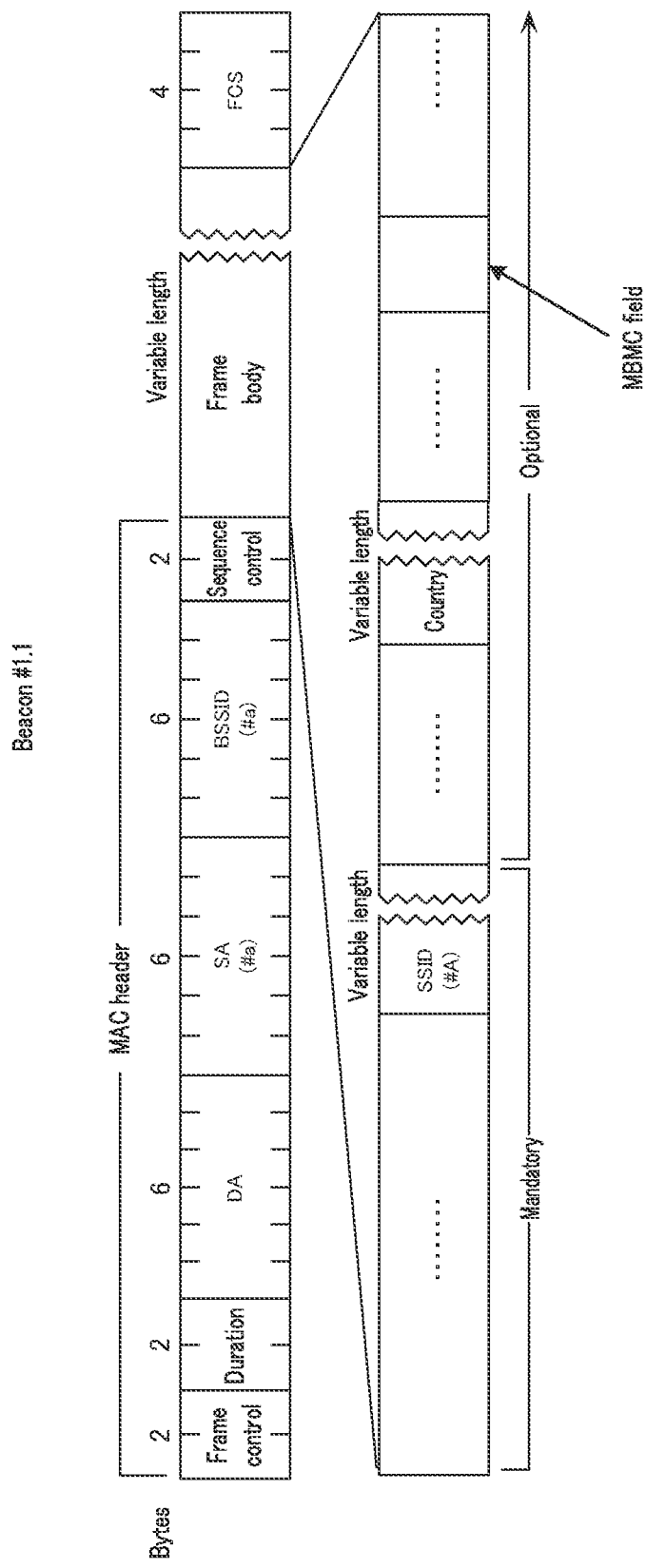
FIG. 9A illustrates an exemplary configuration of the beacon frame.
Figure 9B:
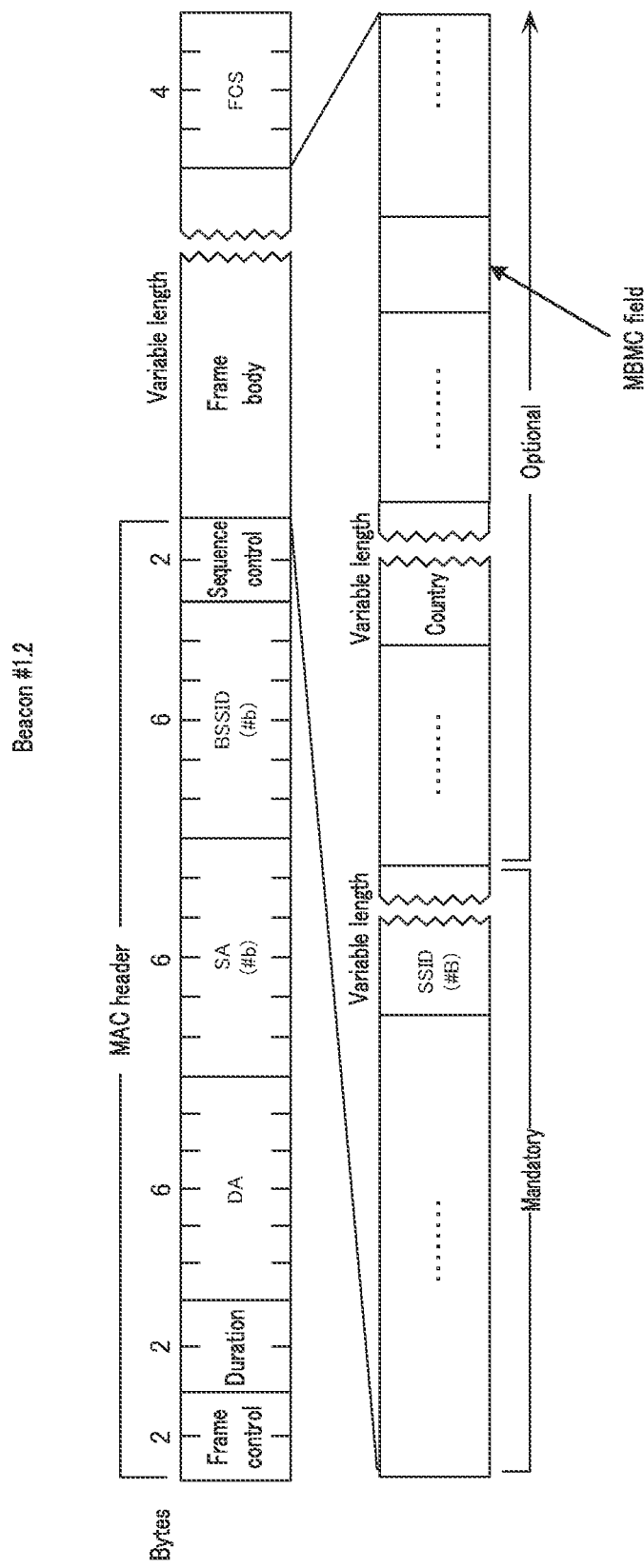
FIG. 9B illustrates an exemplary configuration of the beacon frame.

FIG. 9A illustrates an exemplary configuration of a beacon frame of beacon #1.1. FIG. 9B illustrates an exemplary configuration of a beacon frame of beacon #1.2. As illustrated in FIGS. 9A and 9B, the SA, BSSID, and SSID of beacon #1.1 are different from the SA, BSSID, and SSID of beacon #1.2.

As illustrated in FIGS. 9A and 9B, the MBMC field is provided in "Optional" in the beacon frame of each of beacons #1.1 and #1.2, An SSID for multi-band/multi-channel capability is configured in the MBMC field. The MBMC field only has to be disposed in the optional part of the beacon frame, for example, and is not limited to the position illustrated in FIGS. 9A and 9B.

For example, SSID #B for multi-band capability is configured in the MBMC field of beacon #1.1. That is, SSID #B configured for beacon #1.2 is configured in the MBMC field of beacon #1.1.

Further, SSID #A for multi-band capability is configured in the MBMC field of beacon #1.2. That is, SSID #A configured for beacon #1.1 is configured in the MBMC field of beacon #1.2.

When receiving beacon #1.1, a terminal supporting multiple bands/multiple channels refers to the MBMC field of beacon #1.1. The terminal supporting multiple bands/multiple channels judges (obtains), based on SSID #B in the MBMC field, the second frequency band of beacon #1.2 as a frequency band available for multi-band operation. That is, the terminal supporting multiple bands/multiple channels performs multi-band communication using the first frequency band of received beacon #1.1 and the second frequency band of beacon #1.2 corresponding to SSID #B configured in the MBMC field.

Upon receipt of beacon #1.2, a terminal supporting multiple bands/multiple channels refers to the. MBMC field of beacon #1.2. The terminal supporting multiple bands/multiple channels judges (obtains), based on SSID #A in the MBMC field, the first frequency band of beacon #1.1 as a frequency band available for multi-band operation. That is, the terminal supporting multiple bands/multiple channels performs multi-band communication using the second frequency band of received beacon #1.2 and the first frequency band of beacon #1.1 corresponding to SSID #A configured in the MBMC field.

Legacy terminals do not refer to the MBMC fields of beacon #1.1 and beacon #1.2. The legacy terminals communicate with AP 1a using the frequency band of the beacon corresponding to obtained one of the SSID of beacon #1.1 in the first frequency band and the SSID of beacon #1.2 in the second frequency band.

Information indicating that the MBMC field is invalid may be configured in the MBMC field. For example, in the radio communication system of FIG. 8, when band steering is operated and no MBMC field is used, all 0s or all 1s may be configured in MBMC.

As described above, the AP configures the SSID for multi-band capability in the MBMC field of the beacon frame. The AP transmits by radio to the terminal the beacon frame in which the SSID for multi-band capability is configured. The terminal receives the beacon frame in which the SSID is configured in the MBMC field. The terminal performs multi-band/multi-channel communication based on the SSID configured in the MBMC field. It is thus possible to obtain the effect of enabling the AP and the terminal to operate the multiple bands/multiple channels.

Modification 1

Although it has been described that the SSID for multi-band capability is configured in the MBMC field, a BSSID for multi-band capability may be configured.

For example, MAC address #b may be configured for beacon #1.1 as the BSSID for multi-band capability. Further, MAC address #a may be configured for beacon #1.2 as the BSSID for multi-band capability.

As is understood, the radio communication system can perform multi-band communication also with the BSSID.

The embodiments have been described.

In each of the above embodiments, the multi-band communication and multi-channel communication may be used in combination. For example, the radio communication system may perform the multi-channel communication in the first frequency band, and the multi-band communication in the first frequency band and the second frequency band.

In each of the above embodiments, the AP may transmit beacon #1.1 using the first frequency band as a primary channel. The AP may transmit beacon #1.2 using the second frequency band as a secondary channel.

In this case, an example is assumed in which the SSID of beacon #1.1 in the first frequency band differs from the SSID of beacon #1.2 in the second frequency band. The SA (or BSSID, i.e., MAC address) of beacon #1.1 in the first frequency band and the SA (or BSSID, i.e., MAC address) of beacon #1.2 in the second frequency band may be the same or different from each other.

Information on the second frequency band as the secondary channel is configured in the MBMC field of beacon #1.1. For example, the MBMC field may contain information on a channel position of the secondary channel. Information on the first frequency band as the primary channel does not have to be configured in the MBMC field of beacon #1.2.

In this case, the radio communication system performs the following operations.

When the terminal connects with the AP in the second frequency band alone, the terminal begins communication based on beacon #1.2.

When the terminal connects in the first frequency band alone, or begins the communication in multiple bands of the first frequency band and the second frequency band, the terminal begins the communication based on beacon #1.1.

In particular, in the case of performing multi-band communication, the terminal grasps the position of the channel of the second frequency band based on the information on the second frequency band as the secondary channel in beacon #1.1, to perform communication.

In each of the above embodiments, a random MAC address may be employed. The BSSID of the beacon is changed in the AP when the random MAC address is employed.

In this case, the beacon frame may be provided with an extension field containing information indicating that the MAC address has been changed. This extension field may also contain information on the MAC address before the change of the MAC address. It is thus possible to obtain the effect of enabling the terminal communicating with the AP to identify the AP based on the MAC address before the change and the MAC address after the change.

In addition, the AP may employ the random MAC address depending on the frequency band. For example, the AP may employ the random MAC address in the first frequency band but not in the second frequency band. Note that, although referred to here as the random MAC address, the MAC address of the AP does not have to be randomly changed, and the MAC address may be changed, for example, regularly or the MAC address of the AP may be designated by a device other than the AP. Therefore, the name does not have to be "random MAC address." That is, the name is not limited to this example.

In each of the above embodiments, the AP may be referred to as a base station or a communication apparatus. The terminal may be referred to as a client or a communication apparatus. The beacon may be referred to as a beacon signal. The beacon frame may be referred to as a beacon signal.

For example, the functions of the AP and the terminal in each of the above-described embodiments may be implemented by the following hardware.

Figure 10:
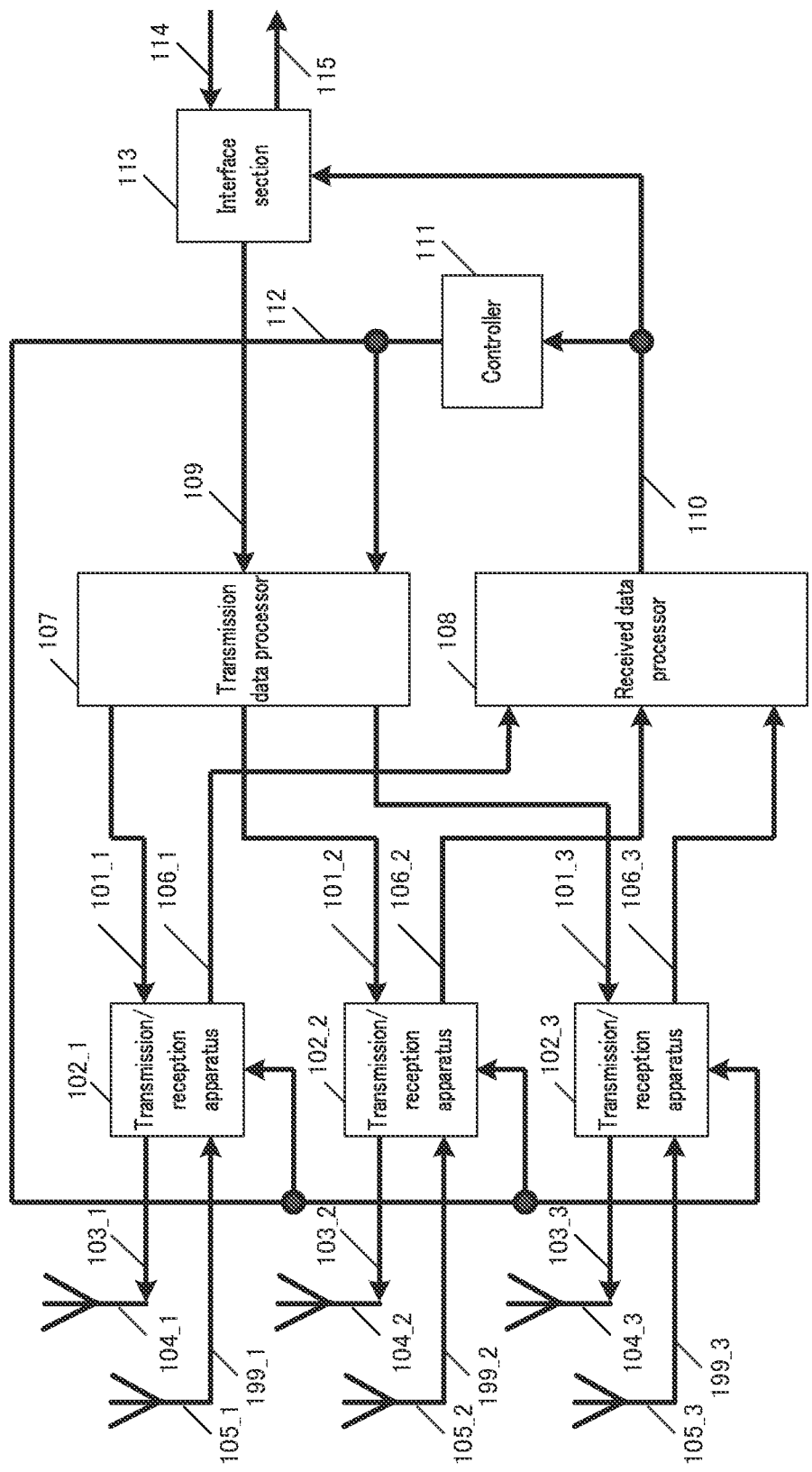
FIG. 10 illustrates a hardware configuration example of a communication apparatus.

FIG. 10 illustrates a hardware configuration example or an exemplary configuration of a communication apparatus. The communication apparatus of FIG. 10 is an AP or a terminal. When the communication apparatus of FIG. 10 is an AP, the communication apparatus can communicate with one or more terminals. The communication apparatus (AP or terminal) may transmit and receive a modulated signal based on, for example, the communication standards described in Non-Patent Literature (hereinafter, referred to as "NPL") 1.

Figure 11:
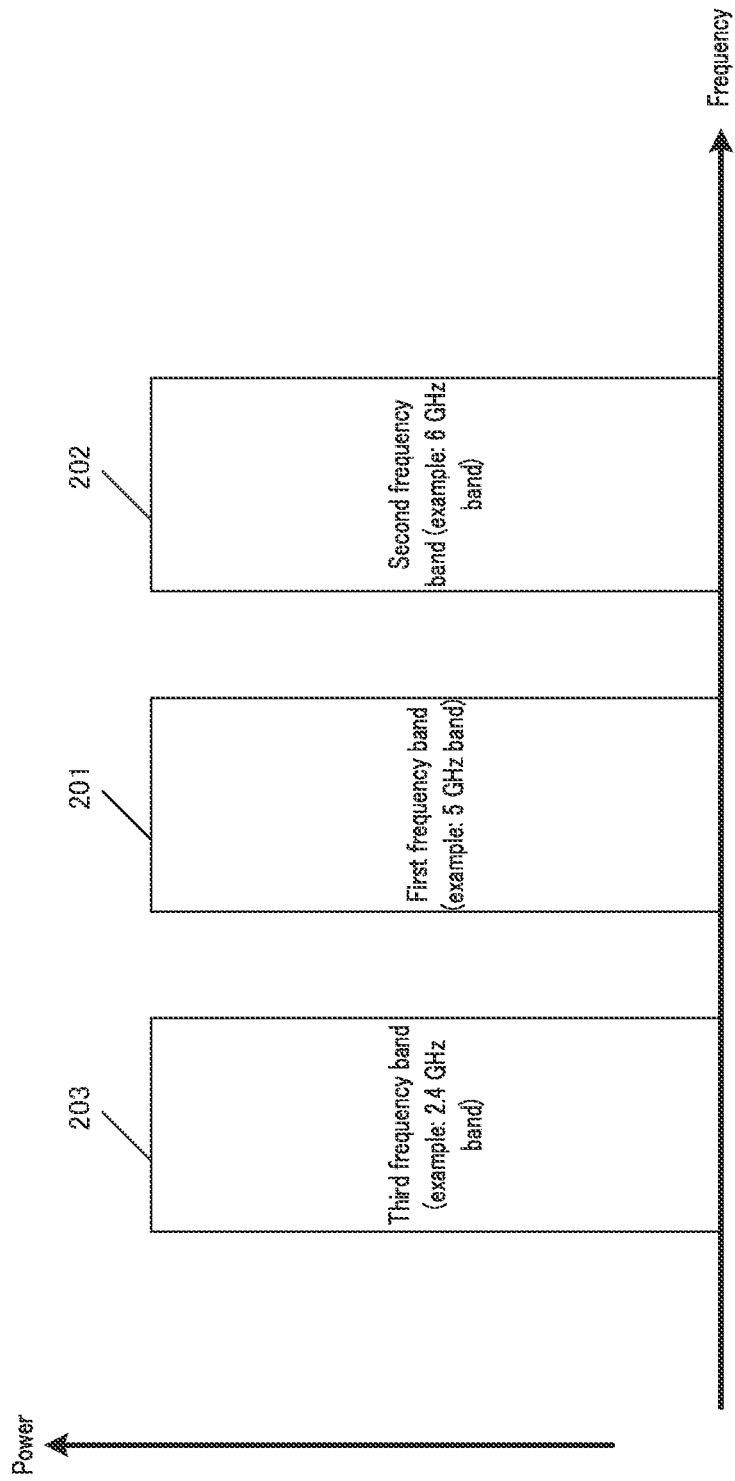
FIG. 11 illustrates an example of the modulated signal.

FIG. 11 illustrates examples of a, modulated signal. In FIG. 11, the horizontal axis represents the frequency and the vertical axis represents the power of the modulated signal.

The communication apparatus of FIG. 10 is, for example, an apparatus for performing transmission and reception of the modulated signal in first frequency band 201 that is the 5 GHz band, transmission and reception of the modulated signal in second frequency band 202 that is the 6 (or 7) GHz band, and transmission and reception of the modulated signal in third frequency band 203 that is the 2.4 GHz band as illustrated in FIG. 11.

A description will be given with reference to FIG. 10 again. Antenna 104_1, antenna 105_1, and transmission/reception apparatus 102_1 transmit and receive modulated signals in first frequency band 201. Antenna 104_2, antenna 105_2, and transmission/reception apparatus 102_2 transmit and receive modulated signals in second frequency band 202. Antenna 104_3, antenna 105_3, and transmission/reception apparatus 102_3 transmit and receive modulated signals in third frequency band 203.

Controller 111 outputs control signal 112 to transmission data processor 107, transmission/reception apparatus 102_1, transmission/reception apparatus 102_2, and transmission/reception apparatus 102_3. Controller 111 may be composed of a processor such as a Central Processing Unit (CPU) or a Digital Signal Processor (DSP), for example.

Signal 114 including data is inputted to interface section 113. Interface section 113 outputs data 109 to transmission data processor 107. Interface section 113 receives received data group 110 outputted from received data processor 108. Interface section 113 outputs signal 115 to a processing block (not illustrated).

Data 109 is inputted to transmission data processor 107. In addition, control signal 112 is inputted to transmission data processor 107.

Transmission data processor 107 outputs first data 101_1, second data 101_2, and third data 101_3 respectively to transmission/reception apparatus 102_1, transmission/reception apparatus 102_2, and transmission/reception apparatus 102_3 based on control signal 112.

For example, when the AP transmits the modulated signal in first frequency band. 201, transmission data processor 107 outputs first data 101_1 to transmission/reception apparatus 102_1. When the AP transmits the modulated signal in second frequency band 202, transmission data processor 107 outputs second data 101_2 to transmission/reception apparatus 102_2. When the AP transmits the modulated signal in third frequency band 203, transmission data processor 107 outputs third data 101_3 to transmission/reception apparatus 102_3.

Further, for example, when the AP transmits the modulated signal in first frequency band 201, the modulated signal in second frequency band 202, and the modulated signal in third frequency band 203, transmission data processor 107 outputs first data 101_1, second data 101_2, and third data 101_3 to transmission/reception apparatus 102_1, transmission/reception apparatus 102_2, and transmission/reception apparatus 102_3.

First data 101_1 is inputted to transmission/reception apparatus 102_1. In addition, control signal 112 is inputted to transmission/reception apparatus 102_1.

Transmission/reception apparatus 102_1 performs processing such as encoding and mapping of an error correction code on first data 101_1 based on information such as a transmission method, a modulation scheme, and an error correction coding scheme included in control signal 112, generates first transmission signal 103_1 in first frequency band 201, and outputs first transmission signal 103_1 to antenna 104_1. Transmission signal 103_1 of the first modulated signal is outputted as a radio wave from antenna 104_1.

Second data 101_2 is inputted to transmission/reception apparatus 102_2. In addition, control signal 112 is inputted to transmission/reception apparatus 102_2.

Transmission/reception apparatus 102_2 performs processing such as encoding and mapping of an error correction code on second data 101_2 based on information such as a transmission method, a modulation scheme, and an error correction coding scheme included in control signal 112, generates second transmission signal 103_2 in second frequency band 202, and outputs second transmission signal 103_2 to antenna 104_2. Transmission signal 103_2 of the second modulated signal is outputted as a radio wave from antenna 104_2.

Third data 101_3 is inputted to transmission/reception apparatus 102_3. In addition, control signal 112 is inputted to transmission/reception apparatus 102_3.

Transmission/reception apparatus 102_3 performs processing such as encoding and mapping of an error correction code on third data 101_3 based on information such as a transmission method, a modulation scheme, and an error correction coding scheme included in control signal 112, generates third transmission signal 103_3 in third frequency band 203, and outputs third transmission signal 103_3 to antenna 104_3. Transmission signal 103_3 of the third modulated signal is outputted as a radio wave from antenna 104_3.

Note that antenna 104_1, antenna 104_2, and antenna 104_3 mean that each of the antennas includes one antenna or a plurality of antennas. When each of the antennas is composed of a plurality of antennas, a plurality of modulated signals are transmitted, and the communication apparatus can perform Multiple-Input Multiple-Output (MIMO) or Multiple-Input Single-Output (MISO) transmission.

When antenna 105_1 receives the modulated signal in first frequency band 201, first received signal 199_1 is inputted to transmission/reception apparatus 102_1. Transmission/reception apparatus 102_1 performs processing such as demodulation (demapping) and decoding of an error correction code on first received signal 199_1, and outputs first data group 106_1 to received data processor 108.

When antenna 105_2 receives the modulated signal in second frequency band 202, second received signal 199_2 is inputted to transmission/reception apparatus 102_2. Transmission/reception apparatus 102_2 performs processing such as demodulation (demapping) and decoding of an error correction code on second received signal 199_2, and outputs second data group 106_2 to received data processor 108.

When antenna 105_3 receives the modulated signal in third frequency band 203, third received signal 199_3 is inputted to transmission/reception apparatus 102_3. Transmission/reception apparatus 102_3 performs processing such as demodulation (demapping) and decoding of an error correction code on third received signal 199_3, and outputs third data group 106_3 to received data processor 108.

First data group 106_1, second data group 106_2, and third data group 106_3 are inputted to received data processor 108. Received data processor 108 outputs received data group 110 to controller 111 and interface section 113.

Received data group 110 is inputted to controller 111, and controller 111 determines one or more of the first frequency band, the second frequency band, and the third frequency band in which the modulated signal is to be transmitted, and outputs control signal 112 including the determination information. Further, controller 111 outputs control signal 112 including information on a transmission method and a modulation scheme, and a coding scheme for the error correction code for each modulated signal to be transmitted.

Note that antennas 105_1, 105_2, and 105_3 mean that each of the antennas includes one antenna or a plurality of antennas.

Figure 12:
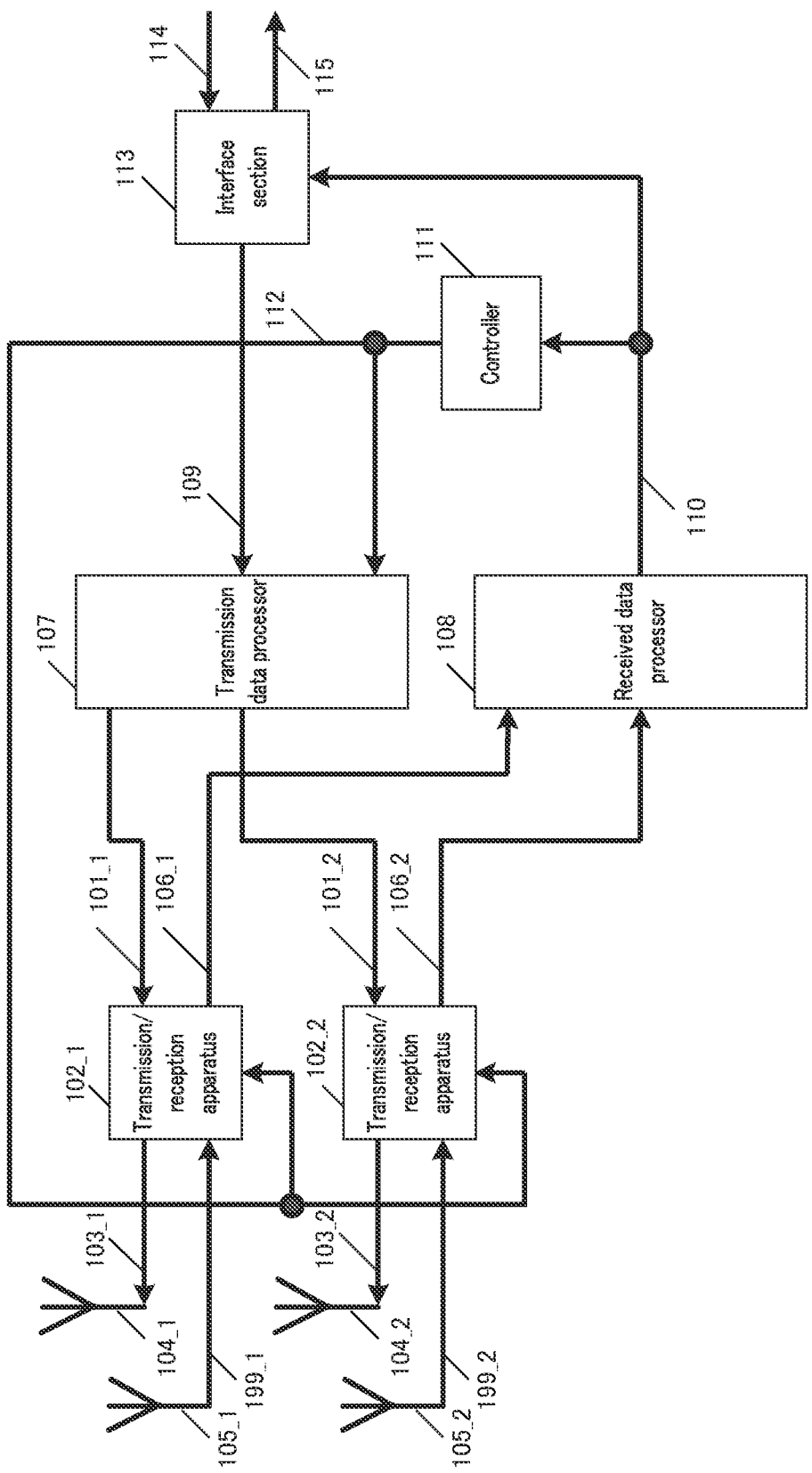
FIG. 12 illustrates another hardware configuration example of the communication apparatus.

FIG. 12 illustrates another example of the hardware configuration of the communication apparatus. The same elements between FIGS. 10 and 12 are provided with the same reference symbols. In communication apparatus of FIG. 12 as compared to the communication apparatus of FIG. 10, a part for performing transmission and reception in third frequency band 203 that is the 2.4 GHz band is omitted.

The communication apparatus illustrated in FIG. 12 is an apparatus supporting two frequency bands (e.g., the 5 GHz band and 6 GHz band) of the 2.4 GHz band, 5 GHz band, and 6 GHz band. When the communication apparatus includes a part performing transmission and reception in the 2.4 GHz band, it is highly likely that the band steering is performed. When the communication apparatus does not include a part performing transmission and reception in the 2.4 GHz band, it is highly likely that the multiple bands/multiple channels are operated.

FIGS. 13A to 13D illustrate examples of multi-band communication performed by a communication apparatus such as an AP or a terminal, in which examples of a frame of a modulated signal transmitted by the communication apparatus are illustrated. In FIGS. 13A to 13D, the vertical axis represents the time, and the horizontal axis represents the frequency (carrier).

Frame 500_1 illustrates the frame configuration in the first frequency band, frame 500_2 illustrates the frame configuration in the second frequency band, and frame 500_3 illustrates the frame configuration in the third frequency band. Data symbols 502_1, 502_2, and 502_3 are symbols for transmitting data.

Figure 13A:
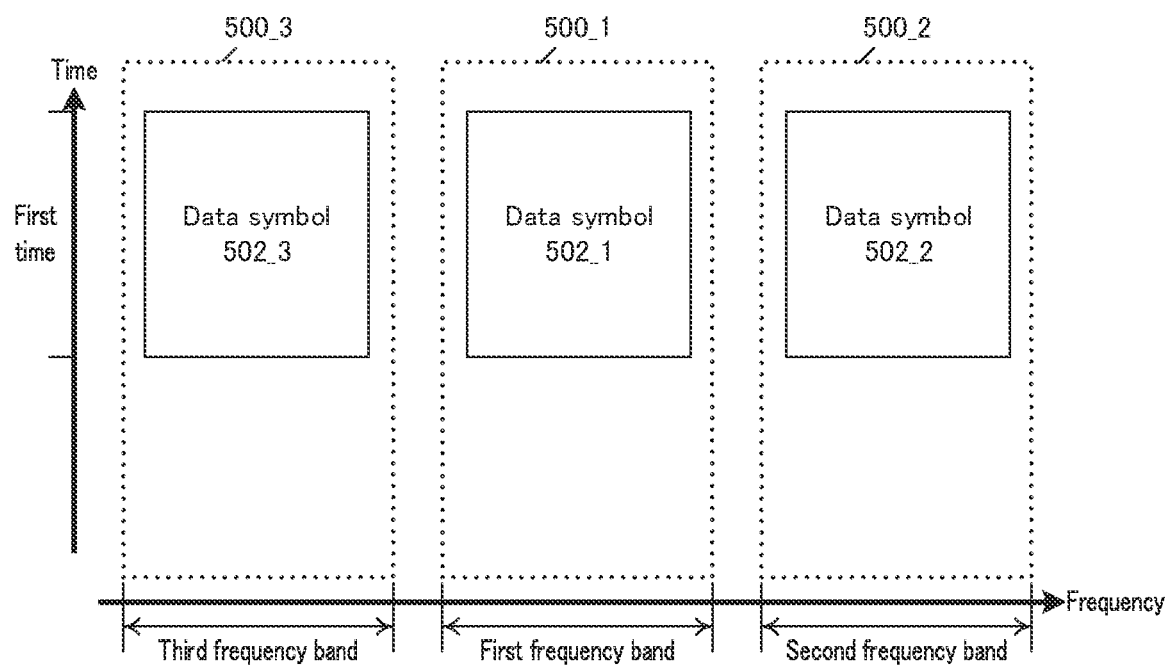
FIG. 13A is an explanatory view for explaining an example of multi-band communication.

FIG. 13A illustrates an exemplary multi-band communication in which data symbols 502_1 to 502_3 are present in the first frequency band, the second frequency band, and the third frequency band at a first time.

Figure 13B:
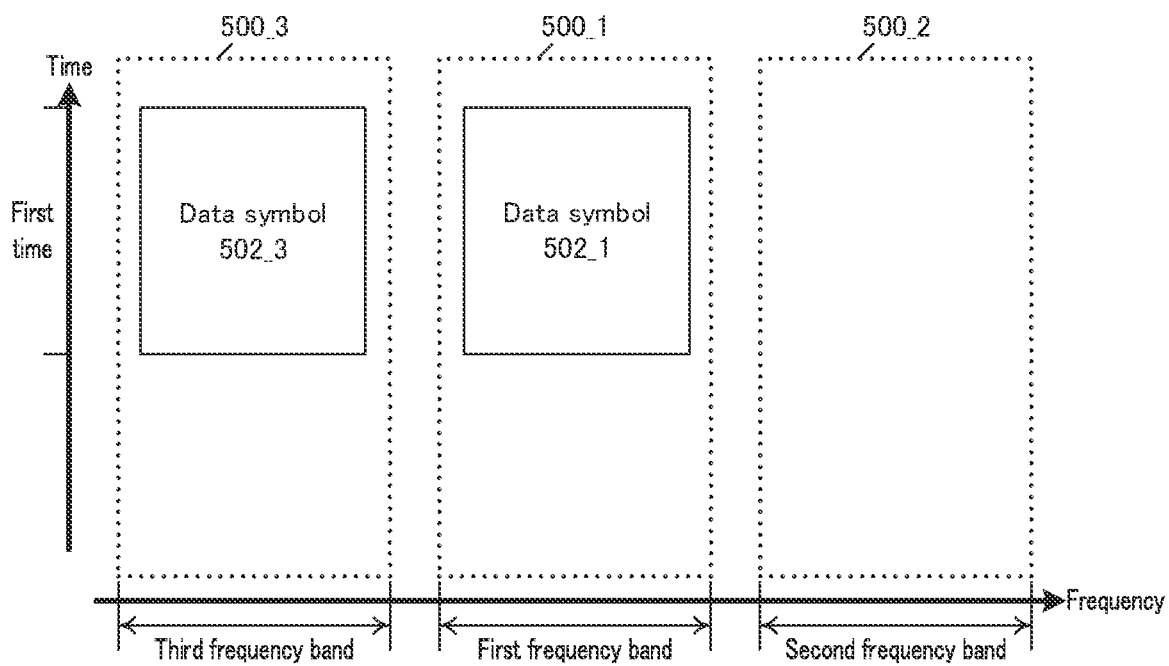
FIG. 13B is an explanatory view for explaining an example of multi-band communication.

FIG. 13B illustrates an exemplary multi-band communication in which data symbols 502_1 and 502_3 are present in the first frequency band and the third frequency band at the first time.

Figure 13C:
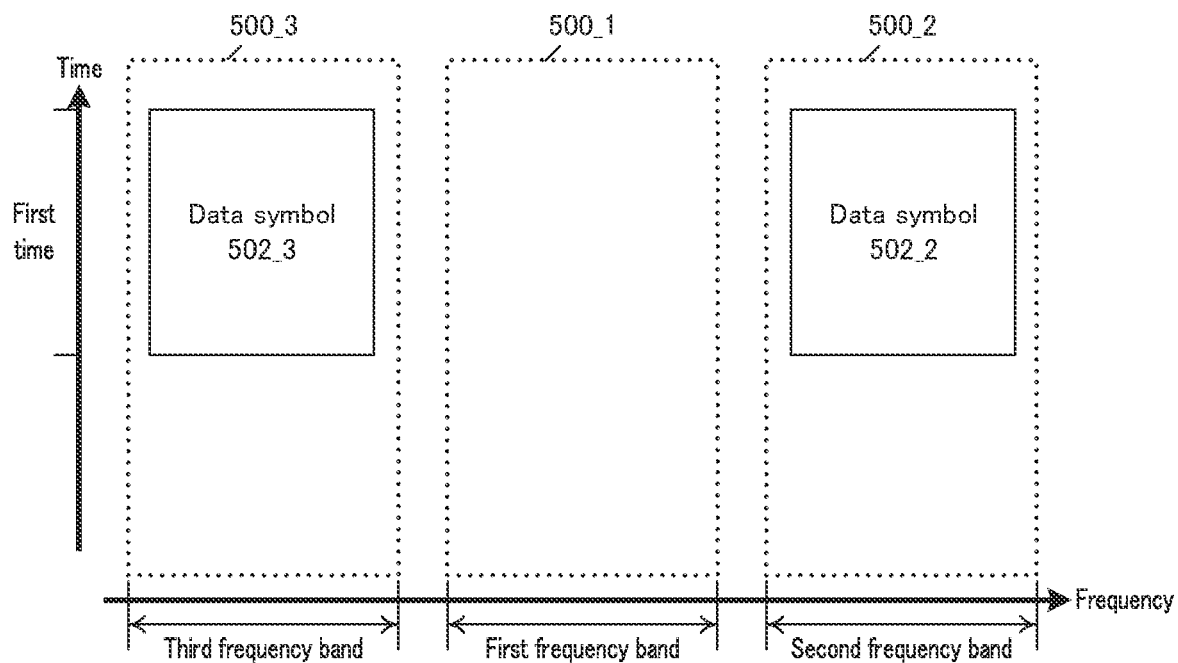
FIG. 13C is an explanatory view for explaining an example of multi-band communication.

FIG. 13C illustrates an exemplary multi-band communication in which data symbols 502_2 and 502_3 are present in the second frequency band and the third frequency band at the first time.

Figure 13D:
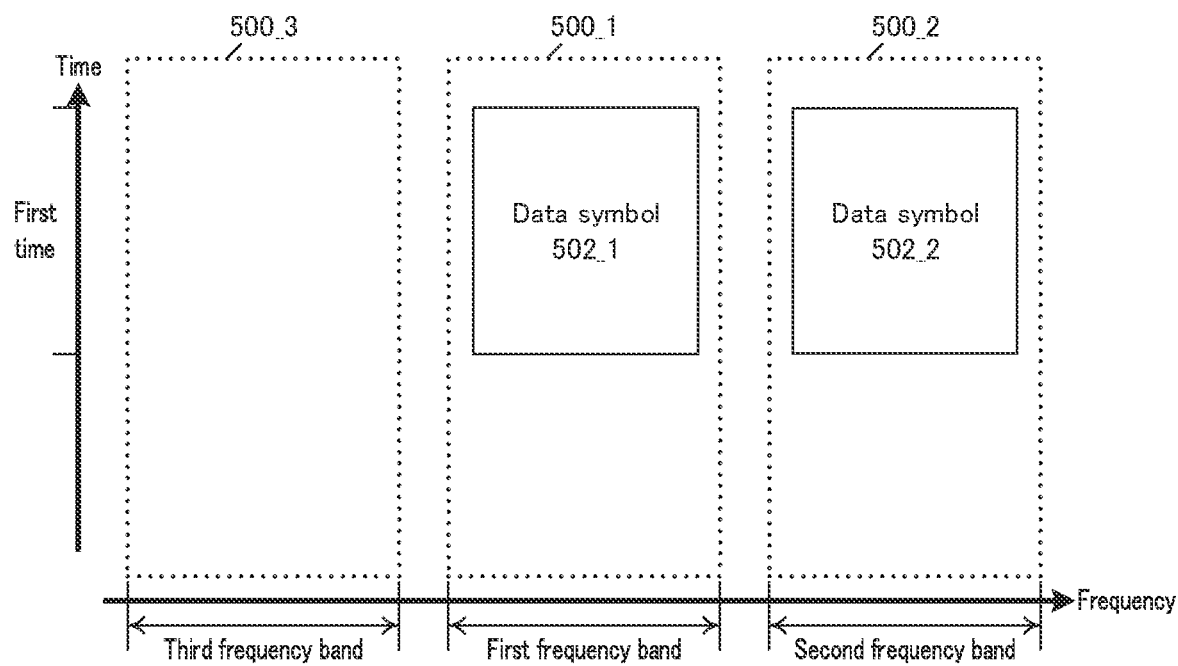
FIG. 13D is an explanatory view for explaining an example of multi-band communication.

FIG. 13D illustrates an exemplary multi-band communication in which data symbols 502_1 and 502_2 are present in the first frequency band and the second frequency band at the first time.

FIGS. 14A to 14H illustrate examples of multi-band communication performed by a communication apparatus such as an AP or a terminal, in which examples of a frame of a modulated signal transmitted by the communication apparatus are illustrated. In FIGS. 14A to 14H, the vertical axis represents the time, and the horizontal axis represents the frequency (carrier).

Frame 500_1 illustrates the frame configuration in the first frequency band, frame 500_2 illustrates the frame configuration in the second frequency band, and frame 500_3 illustrates the frame configuration in the third frequency band. Data symbols 502_1, 502_2, and 502_3 are symbols for transmitting data.

First fields 701_1 to 701_3 include, for example, symbols for a communication partner (terminal) of an AP to perform signal detection, time synchronization, frequency synchronization, channel estimation, and the like. Second fields 702_1 to 702_3 are, for example, fields for transmitting control information to the communication partner (terminal) of the AP, and include information on an error correction coding scheme for generating a symbol addressed to a certain terminal, information on a modulation scheme, information on a transmission method, and the like.

Figure 14A:
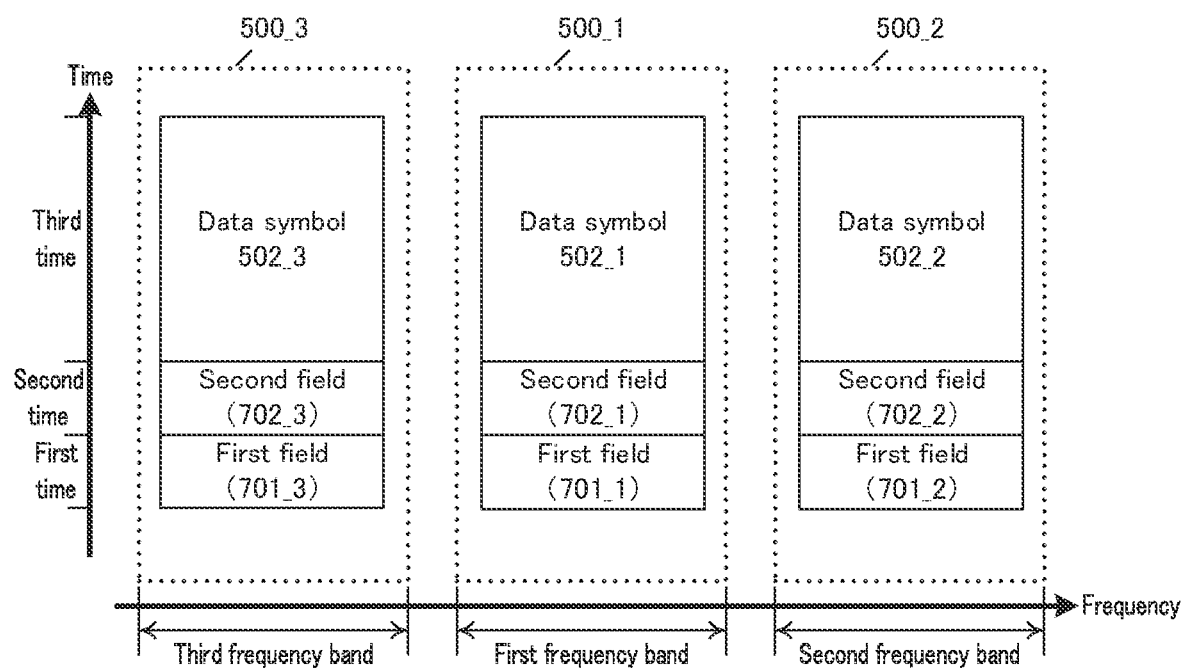
FIG. 14A is an explanatory view for explaining an example of multi-band communication.

FIG. 14A illustrates an example of multi-band communication in which first fields 701_1 to 701_3 are present in the first frequency band, the second frequency hand, and the third frequency band at a first time, second fields 702_1 to 702_3 are present in the first frequency hand, the second frequency band, and the third frequency band at a second time, and data symbols 502_1 to 502_3 are present in the first frequency hand, the second frequency hand, and the third frequency band at a third time.

Figure 14B:
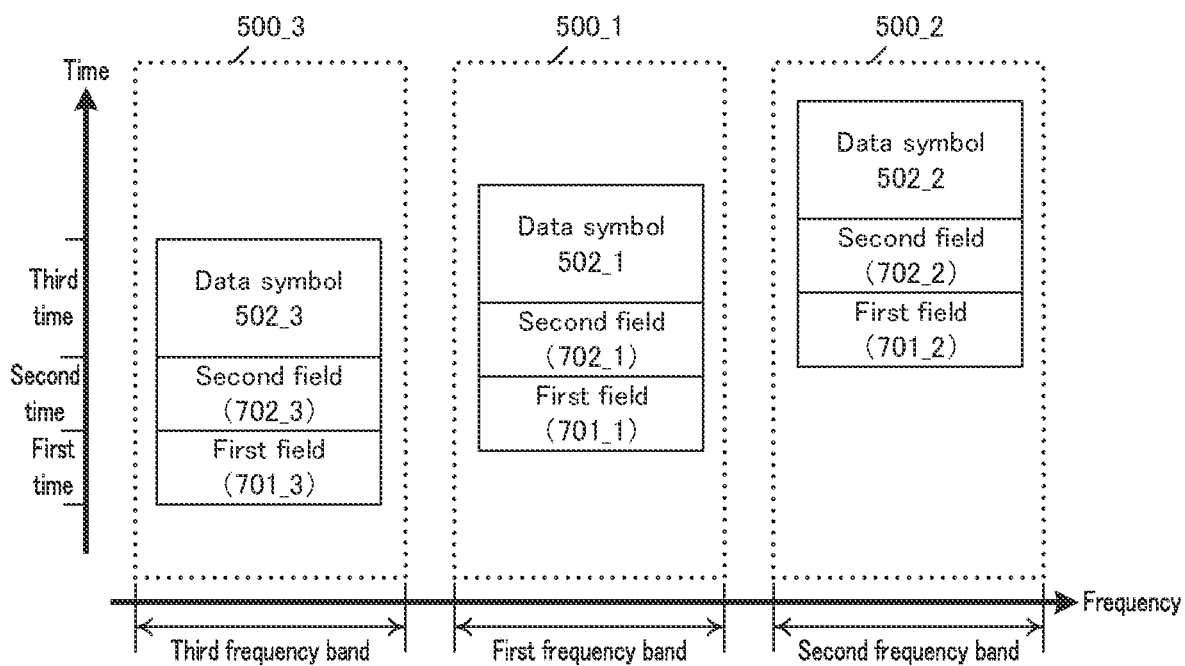
FIG. 14B is an explanatory view for explaining an example of multi-band communication.

FIG. 14B illustrates an example of multi-band communication in which symbols are present in the first frequency band, the second frequency band, and the third frequency band at respective ones of the first time to the third time. This is an example in which the temporal timings at which the existing symbols are present are different between the frequency bands. However, the temporal timings at which the symbols are present are merely an example, and are not limited to this.

Figure 14C:
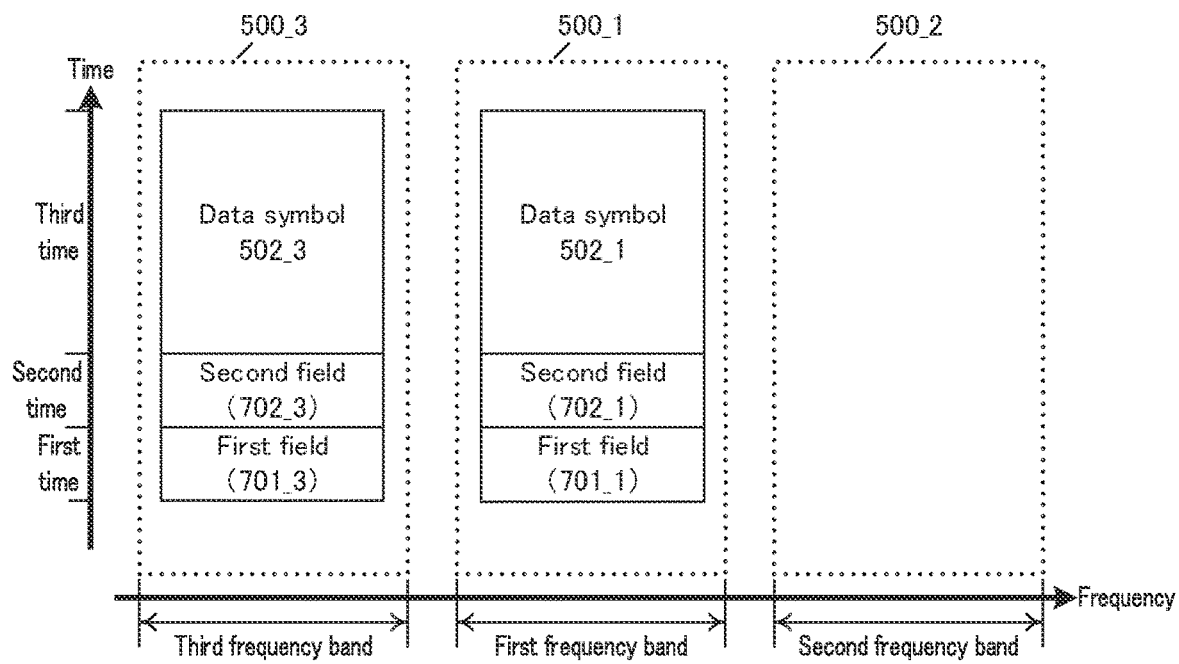
FIG. 14C is an explanatory view for explaining an example of multi-band communication.

FIG. 14C illustrates an example of multi-band communication in winch first fields 701_1 and 701_3 are present in the first frequency band and the third frequency band at the first time, second fields 702_1 and 702_3 are present in the first frequency band and the third frequency band at the second time, and data symbols 502_1 and 502_3 are present in the first frequency band and the third frequency band at the third time.

Figure 14D:
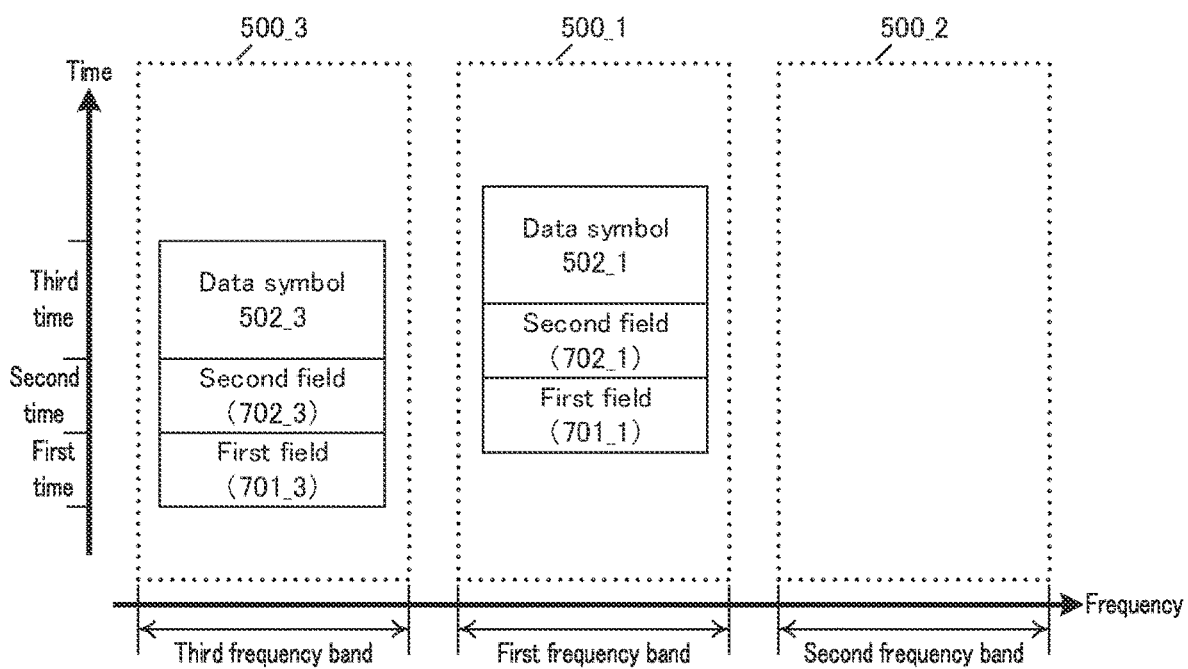
FIG. 14D is an explanatory view for explaining an example of multi-band communication.

FIG. 14D illustrates an example of multi-band communication in which symbols are present in the first frequency band and the third frequency band at respective ones of the first time to the third time. This is an example in which the temporal timings at which the existing symbols are present are different between the frequency bands. However, the temporal timings at which the symbols are present are merely an example, and are not limited to this.

Figure 14E:
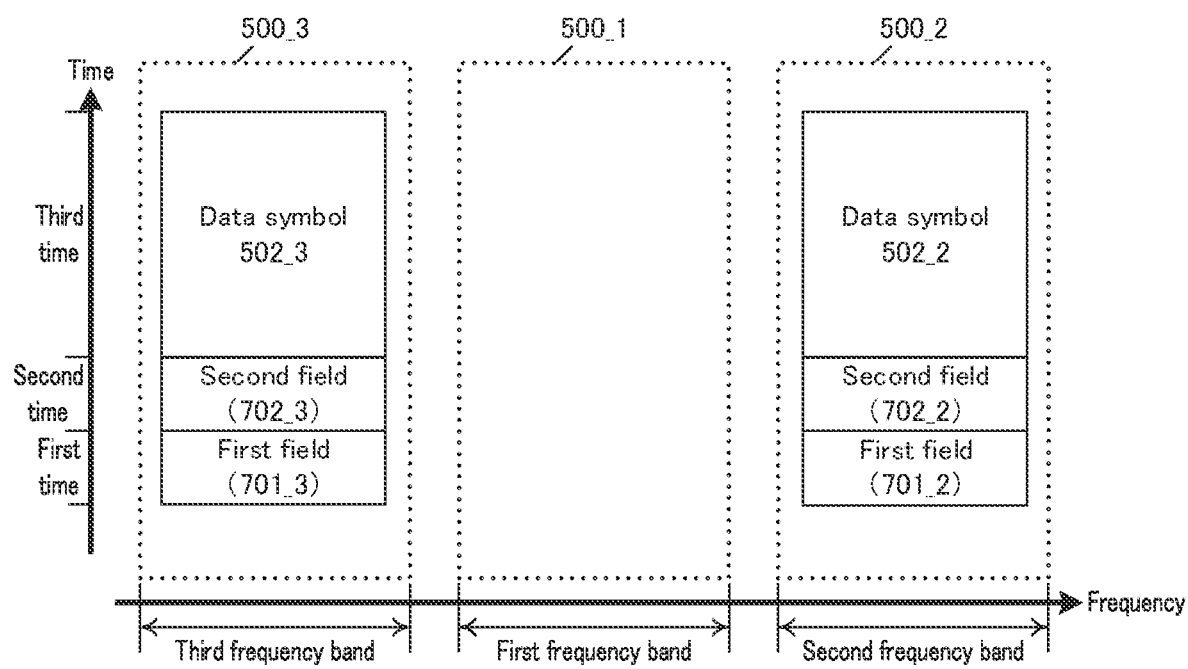
FIG. 14E is an explanatory view for explaining an example of multi-band communication.

FIG. 14E illustrates an example of multi-band communication in which first fields 701_2 and 701_3 are present in the second frequency band and the third frequency band at the first time, second fields 702_2 and 702_3 are present in the second frequency band and the third frequency band at the second time, and data symbols 502_2 and 502_3 are present in the second frequency band and the third frequency band at the third time.

Figure 14F:
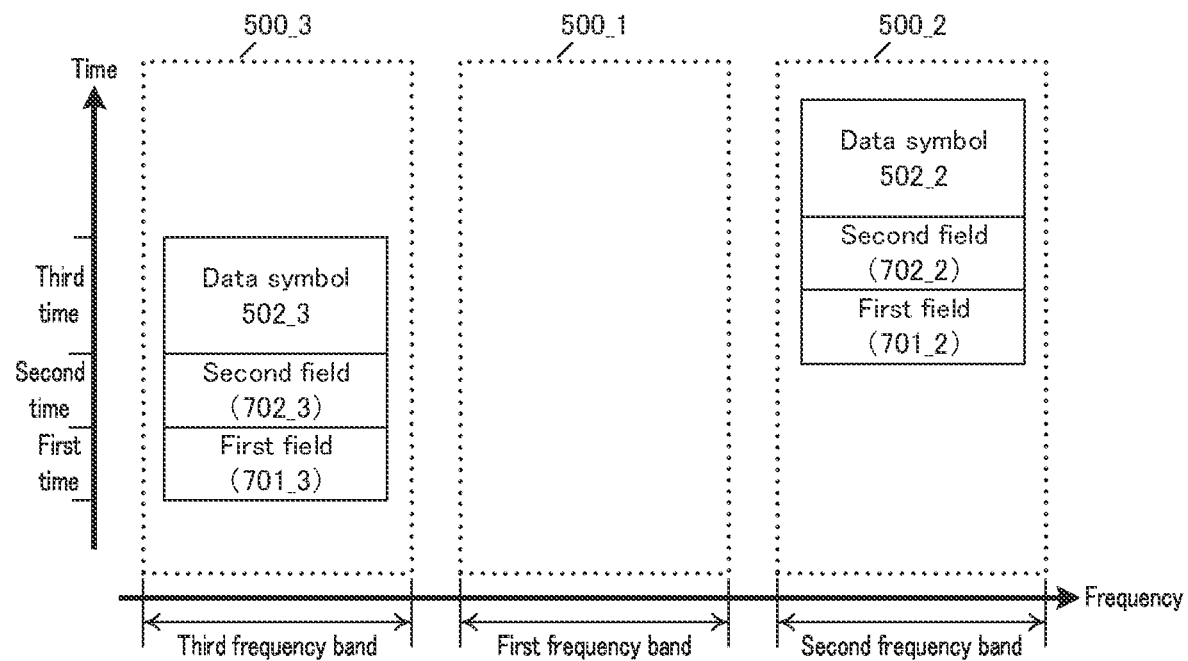
FIG. 14F is an explanatory view for explaining an example of multi-band communication.

FIG. 14F illustrates an example of multi-band communication in which symbols are present in the second frequency band and the third frequency band at respective ones of the first time to the third time. This is an example in which the temporal timings at which the existing symbols are present are different between the frequency bands. However, the temporal timings at which the symbols are present are merely an example, and are not limited to this.

Figure 14G:
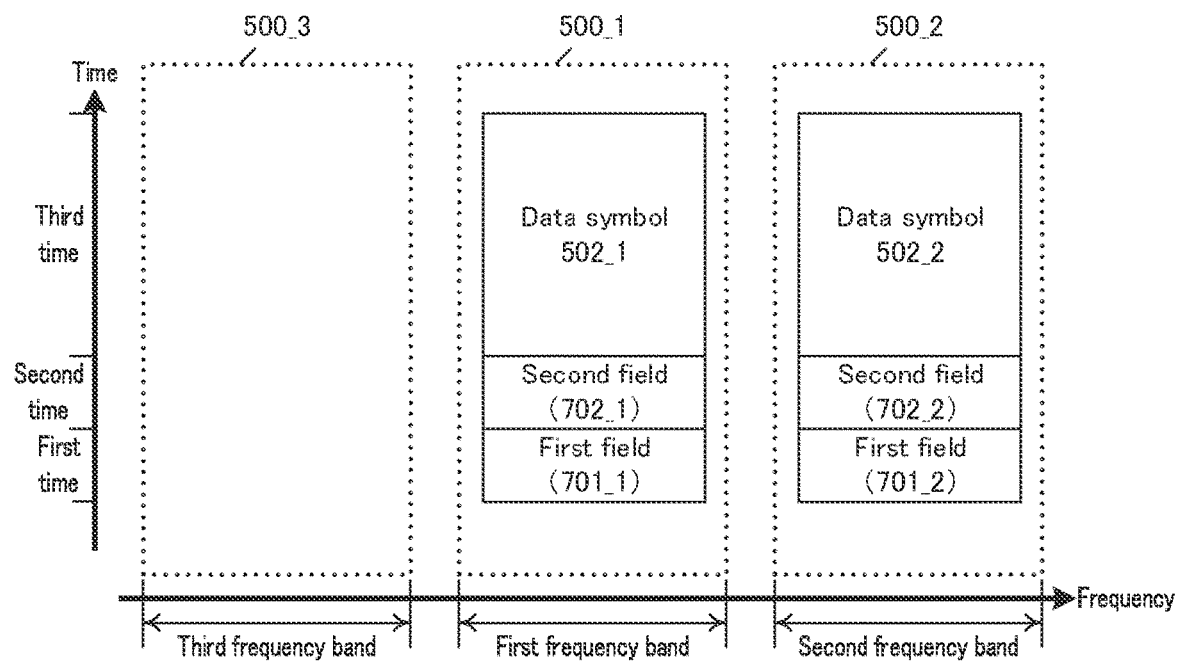
FIG. 14G is an explanatory view for explaining an example of multi-band communication.

FIG. 14G illustrates an example of multi-band communication in which first fields 701_1 and 701_2 are present in the first frequency hand and the second frequency band at the first time, second fields 702_1 and 702_2 are present in the first frequency hand and the second frequency hand at the second time, and data symbols 502_1 and 502_2 are present in the first frequency band and the second frequency band at the third time.

Figure 14H:
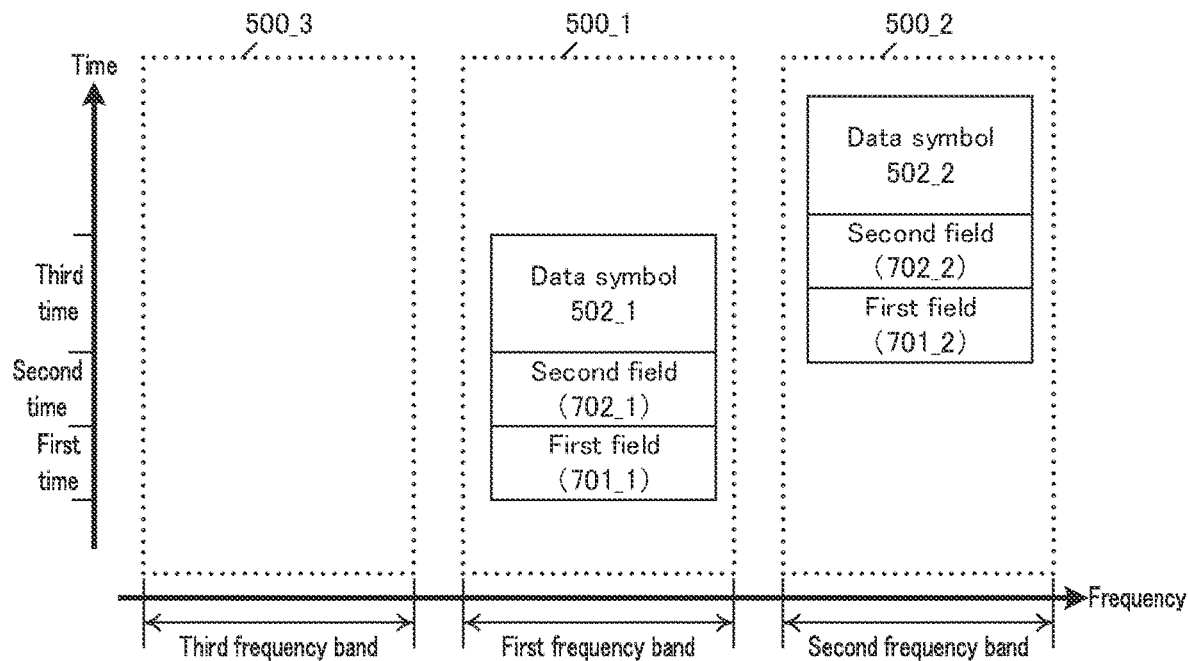
FIG. 14H is an explanatory view for explaining an example of multi-band communication.

FIG. 14H illustrates an example of multi-band communication in which symbols are present in the first frequency band and the second frequency band at respective ones of the first time to the third time. This is an example in which the temporal timings at which the existing symbols are present are different between the frequency bands. However, the temporal timings at which the symbols are present are merely an example, and are not limited to this.

Figure 15:
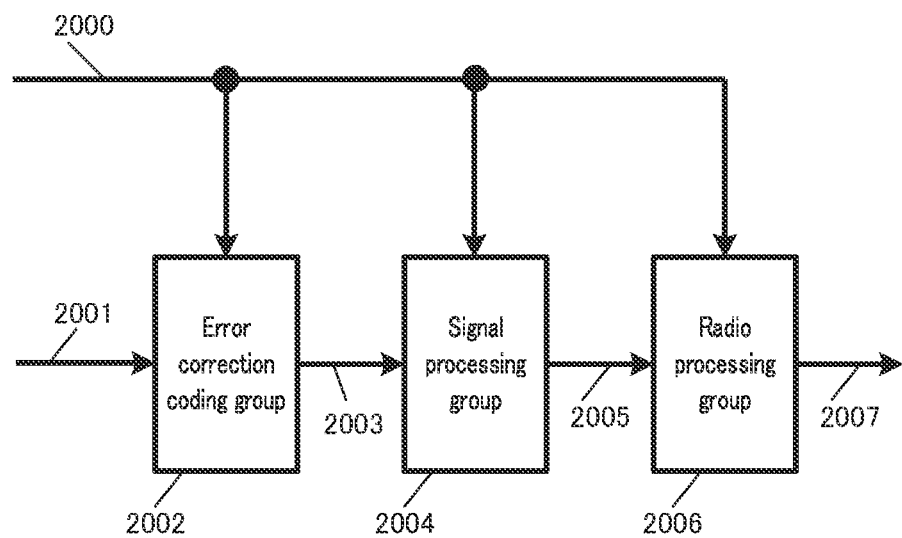
FIG. 15 illustrates an exemplary configuration of a transmitter included in a transmission/reception apparatus.

FIG. 15 illustrates an exemplary configuration of a transmitter included in each of transmission/reception apparatuses 102_1 to 102_3 of FIG. 10.

Control signal 2000 is inputted to error correction coding group 2002. In addition, data 2001 is inputted to error correction coding group 2002.

Control signal 2000 includes, for example, information on an error correction coding scheme, such as a code type, a code length, and a coding rate. Error correction coding group 2002 performs error correction coding on data 2001 based on control signal 2000, and outputs encoded data group 2003 to signal processing group 2004.

Error correction coding group 2002 may include one or more error correction encoders. In this case, encoded data group 2003 is composed of one or more pieces of encoded data.

Control signal 2000 is inputted to signal processing group 2004. Further, encoded data group 2003 is inputted to signal processing group 2004.

Signal processing group 2004 performs processing such as mapping (modulation), precoding, and interleaving based on control signal 2000, and outputs modulated signal group 2005 to radio processing group 2006.

For example, when outputting a single modulated signal, signal processing group 2004 performs, for example, processing of interleaving and mapping, and outputs the single modulated signal as modulated signal group 2005 to radio processing group 2006. Further, when outputting a plurality of modulated signals, signal processing group 2004 performs, for example, interleaving, mapping, and when necessary, precoding, and outputs a plurality of modulated signals to radio processing group 2006 as modulated signal group 2005.

Control signal 2000 is inputted to radio processing group 2006. Further, modulated signal group 2005 is inputted to radio processing group 2006.

Radio processing group 2006 performs, on modulated signal group 2005, processing such as, for example, processing of generating an Orthogonal Frequency Division Multiplexing (OFDM) signal, orthogonal modulation, frequency conversion, and the like based on control signal 2000, and outputs transmission signal group 2007 to the antenna. Transmission signal group 2007 is transmitted as a radio wave from the antenna.

Note that, OFDM does not have to be used, anal a signal processor for a single-carrier system may be provided. Examples of the single carrier system include "Discrete Fourier Transform (DFT)-Spread Orthogonal Frequency Division Multiplexing (OFDM)," "Trajectory Constrained DFT-Spread OFDM," "OFDM based Single Carrier (SC)," "Single Carrier (SC)-Frequency Division Multiple Access (FDMA)," "Guard interval DFT-Spread OFDM," and the like, for example.

Radio processing group 2006 generates transmission signal group 2007 of N transmission signals when modulated signal group 2005 is composed of N modulated signals. The character "N" denotes an integer equal to or greater than 1.

When composed of a plurality of transmission signals, transmission signal group 2007 is transmitted as radio waves using a plurality of antennas. Note that, when MIMO transmission is used, a plurality of modulated signals are transmitted at the same frequency and at the same time.

Figure 16:
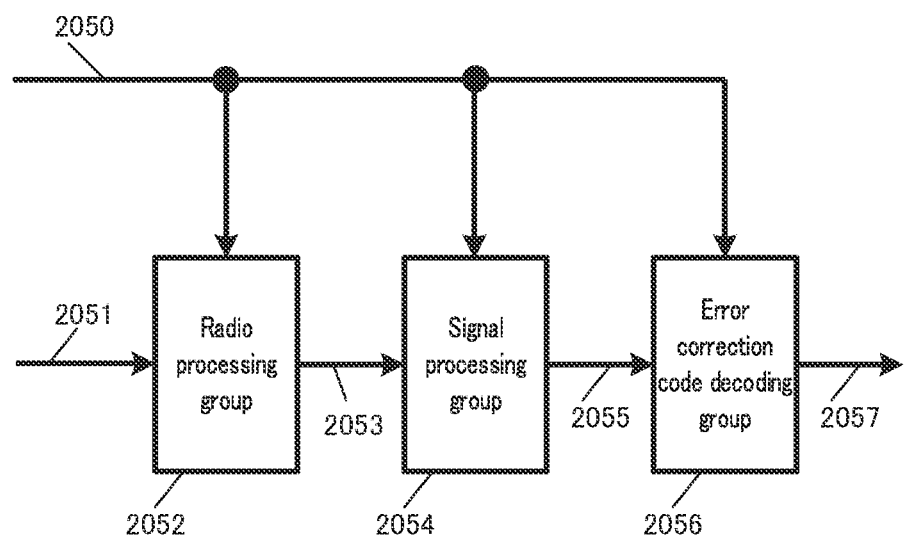
FIG. 16 illustrates an exemplary configuration of a receiver included in the transmission/reception apparatus.

FIG. 16 illustrates an exemplary configuration of a receiver included in each of transmission/reception apparatuses 102_1 to 102_3 of FIG. 10.

Control signal 2050 is inputted to radio processing group 2052. Further, received signal group 2051 is inputted to radio processing group 2052.

Radio processing group 2052 performs frequency conversion, orthogonal demodulation, and processing for OFDM on received signal group 2051 based on control signal 2050, and outputs baseband signal group 2053 to signal processing group 2054.

Note that, OFDM does not have to be used, and a signal processor for a single-carrier system may be provided. Examples of the single carrier system include "Discrete Fourier Transform (DFT)-Spread Orthogonal Frequency Division Multiplexing (OFDM)," "Trajectory Constrained DFT-Spread OFDM," "OFDM based Single Carrier (SC)," "Single Carrier (SC)-Frequency Division Multiple Access (FDMA)," "Guard interval DFT-Spread OFDM," and the like, for example.

Note that, received signal group 2051 may be composed of one or more received signals, and baseband signal group 2053 may be composed of one or more baseband signals.

Control signal 2050 is inputted to signal processing group 2054. Further, baseband signal group 2053 is inputted to signal processing group 2054.

Signal processing group 2054 performs signal detection, time synchronization, frequency synchronization, frequency offset estimation, channel estimation, and the like, and, also performs demapping on baseband signal group 2053 based on control signal 2050, and outputs likelihood 2055 of received bits to error correction code decoding group 2056.

Control signal 2050 is inputted to error correction code decoding group 2056. Likelihood 2055 of the received bits is inputted to error correction code decoding group 2056.

Error correction code decoding group 2056 decodes the error correction code with respect to likelihood 2055 of the received bits based on the information on the error correction coding scheme included in control signal 2050 and outputs received data 2057.

Figure 17:
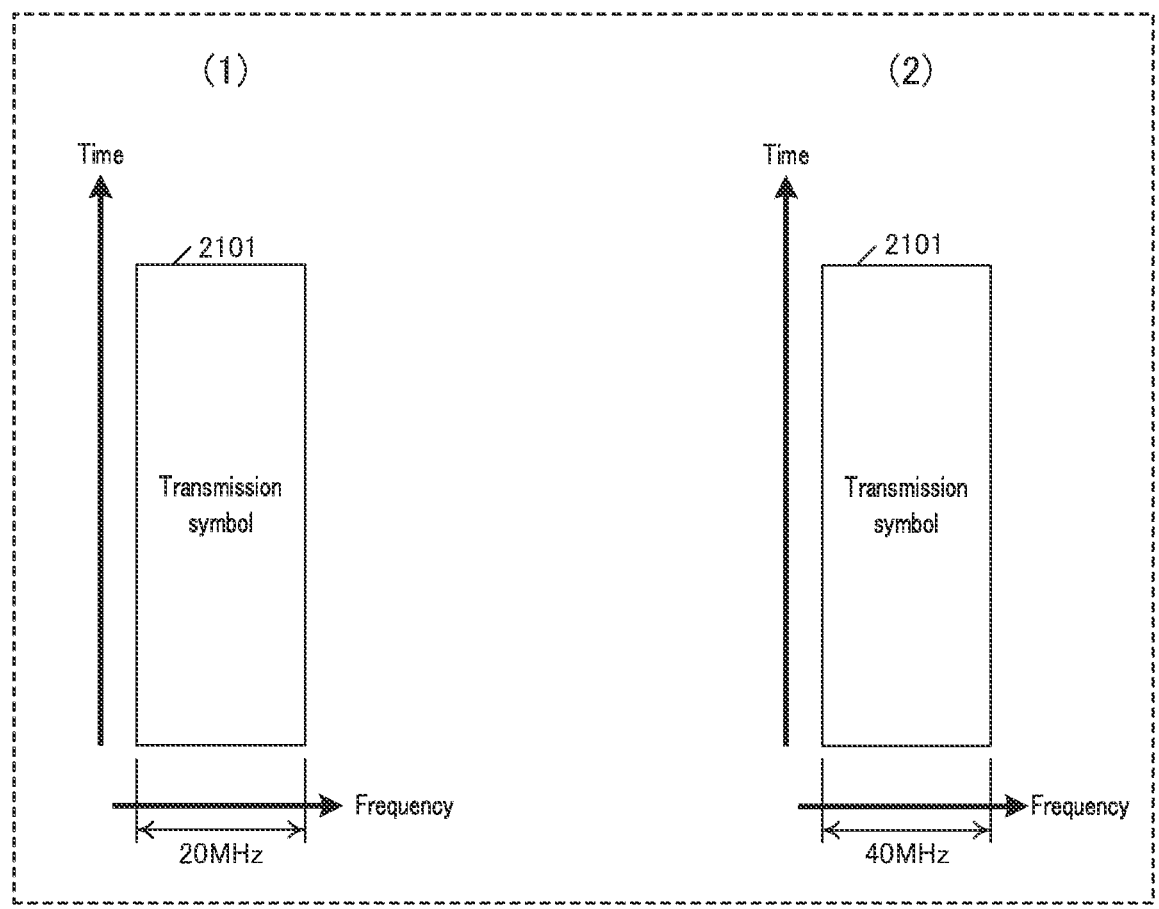
FIG. 17 is an explanatory view for explaining an example of multi-channel communication.

FIG. 17 is an explanatory view for explaining an example of multi-channel communication. Parts (1) and (2) illustrated in FIG. 17 illustrate examples of the bandwidths used by, for example, the AP (or terminal) when transmitting the modulated signals using the third frequency band.

At (1) of FIG. 17, the horizontal axis represents the frequency, and the vertical axis represents the time. Transmission symbol 2101 indicates a symbol included in the modulated signal. The bandwidth of transmission symbol 2101 is 20 MHz.

At (2) of FIG. 17, the horizontal axis represents the frequency, and the vertical axis represents the time. Transmission symbol 2101 indicates a symbol included in the modulated signal. The bandwidth of transmission symbol 2101 is 40 MHz.

The AP (or terminal) may channel bond the frequency bands of 20 MHz and 40 MHz when transmitting the modulated signals using the third frequency band. Note that, the frequency bands illustrated at (1) and (2) of FIG. 17 are merely examples.

Figure 18:
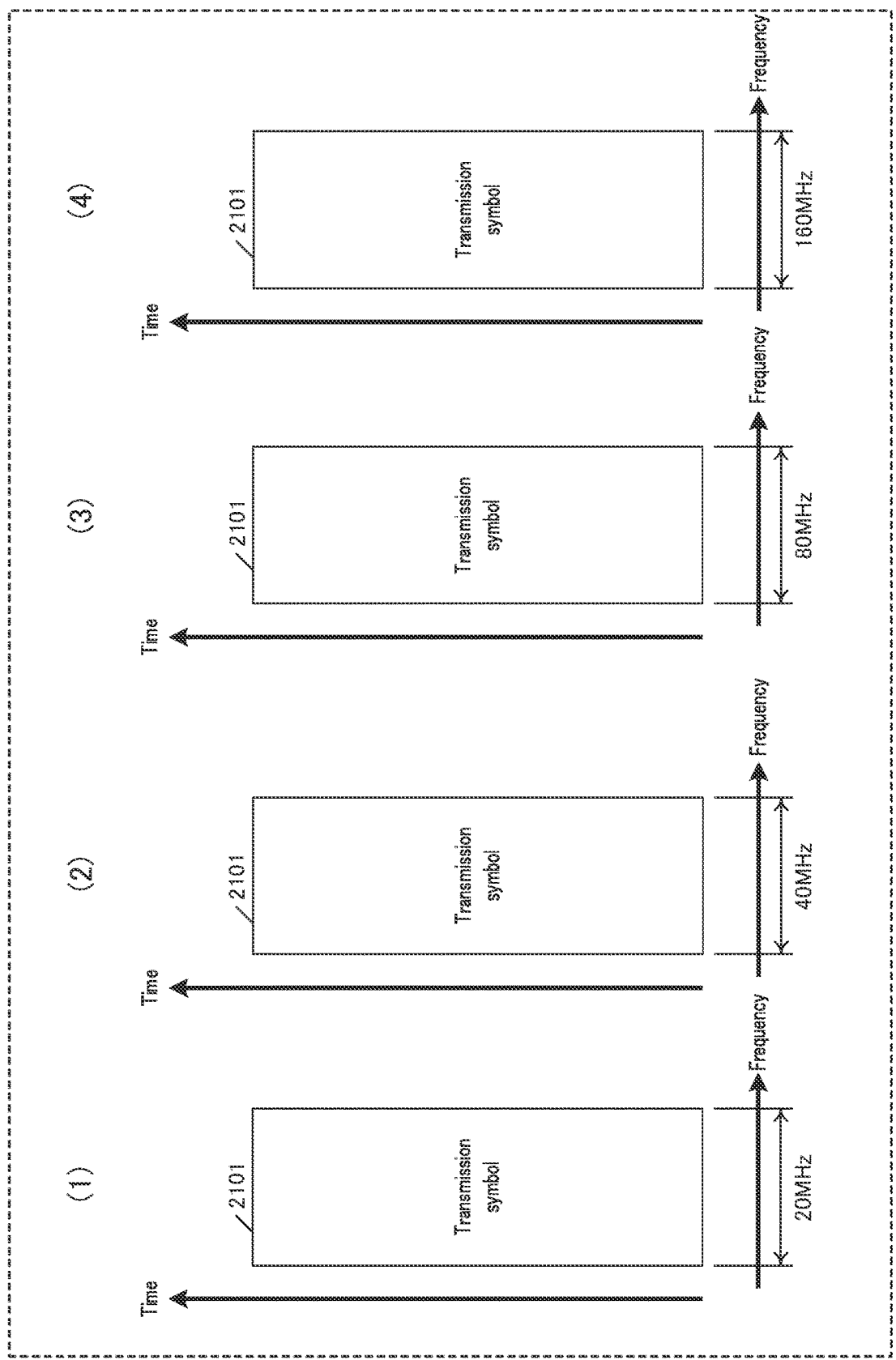
FIG. 18 is an explanatory view for explaining an example of multi-channel communication.

FIG. 18 is an explanatory view for explaining an example of multi-channel communication. Parts (1), (2), (3), and (4) illustrated in FIG. 18 illustrate examples of the frequency bands used by, for example, the AP (or terminal) when transmitting the modulated signals using the first frequency band and/or the second frequency band.

At (1) of FIG. 18, the horizontal axis represents the frequency, and the vertical axis represents the time. Transmission symbol 2101 indicates a symbol included in the modulated signal. The bandwidth of transmission symbol 2101 is 20 MHz.

At (2) of FIG. 18, the horizontal axis represents the frequency, and the vertical axis represents the time. Transmission symbol 2101 indicates a symbol included in the modulated signal. The bandwidth of transmission symbol 2101 is 40 MHz.

At (3) of FIG. 18, the horizontal axis represents the frequency, and the vertical axis represents the time. Transmission symbol 2101 indicates a symbol included in the modulated signal. The bandwidth of transmission symbol 2101 is 80 MHz.

At (4) of FIG. 18, the horizontal axis represents the frequency, and the vertical axis represents the time. Transmission symbol 2101 indicates a symbol included in the modulated signal. The bandwidth of transmission symbol 2101 is 160 MHz.

The AP (or terminal) may channel bond two or more of the 20 MHz, 40 MHz, 80 MHz, and 160 MHz frequency bands when transmitting the modulated signals using the first frequency band and/or the second frequency band. Note that (1), (2), (3), and (4) in FIG. 18 are merely examples.

Figure 19:
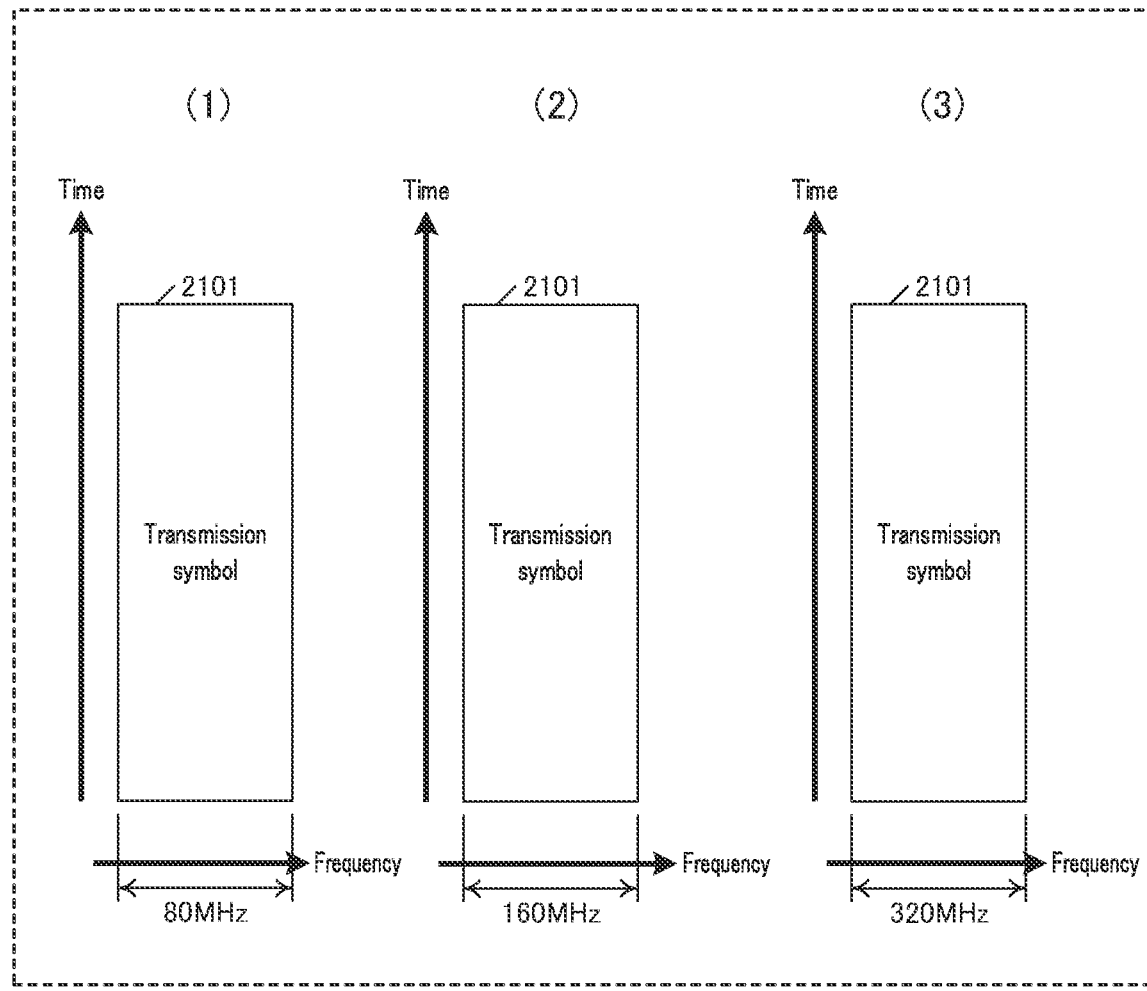
FIG. 19 is an explanatory view for explaining an example of multi-channel communication.

FIG. 19 is an explanatory view for explaining an example of multi-channel communication. Parts (1), (2), and (3) illustrated in FIG. 19 illustrate examples of the frequency bands used by, for example, the AP (or terminal)) when transmitting the modulated signals using the second frequency band.

At (1) of FIG. 19, the horizontal axis represents the frequency, and the vertical axis represents the time. Transmission symbol 2101 indicates a symbol included in the modulated signal. The bandwidth of transmission symbol 2101 is 80 MHz.

At (2) of FIG. 19, the horizontal axis represents the frequency, and the vertical axis represents the time. Transmission symbol 2101 indicates a symbol included in the modulated signal. The bandwidth of transmission symbol 2101 is 160 MHz.

At (3) of FIG. 19, the horizontal axis represents the frequency, and the vertical axis represents the time. Transmission symbol 2101 indicates a symbol included in the modulated signal. The bandwidth of transmission symbol 2101 is 320 MHz.

AP (or terminal) may channel bond two or more of the 80 MHz, 160 MHz, and 320 MHz frequency bands when transmitting the modulated signals using the second frequency band. Note that (1), (2), and (3) in FIG. 19 are merely examples.

Figure 20:
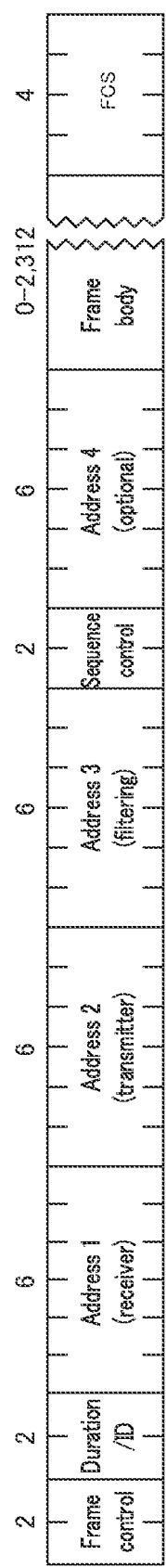
FIG. 20 illustrates an exemplary configuration of a data frame.

FIG. 20 illustrates an exemplary configuration of a data frame. The numerical values in FIG. 20 indicate the data lengths of the fields described below, and the unit is byte. The data frame includes, for example, the following fields.

2-byte frame control (field)
2-byte duration identifier (ID) (field)
6-byte (receiver) address 1 (field)
6-byte (transmitter;) address 2 (field)
6-byte (filtering) address 3 (field)
2-byte sequence control (field)
6-byte (optional) address 4 (field)
Frame body
4-byte Frame Check Sequence (FCS) (field)

Table 1 illustrates a using method of using address fields in data frames.

TABLE 1

| Function | ToDS | FromDS | Address 1 (Receiver) | Address 2 (Transmitter) | Address 3 | Address 4 |
|---|---|---|---|---|---|---|
| IBSS | 0 | 0 | Destination Address (DA) | Source Address (SA) | BSSID | Not used |
| To AP (infrastructure network) | 1 | 0 | BSSID | Source Address (SA) | Destination Address (DA) | Not used |
| From AP (infrastructure network) | 0 | 1 | Destination Address (DA) | BSSID | Source Address (SA) | Not used |
| WDS (bridge) | 1 | 1 | Receiver Address (RA) | Transmitter Address (TA) | Destination Address (DA) | Source Address (SA) |

Note that, in Table 1, IBSS stands for Independent Basic Service Set, AP stands for Access Point, WDS stands for Wireless Distribution System, DS stands for Distribution System, BSSID stands fir Basic Service Set Identifier (ID), DA stands for Destination Address, SA stands for Source Address, RA stands for Receiver Address, and TA stands for Transmitter Address. However, FIG. 20 is only an example of a data frame, the data frame is not limited to this configuration.

Next, a description will be given of the BSSID and Service Set ID (SSID).

BSSID:

In an infrastructure network, the BSSID is the MAC address of a radio interface of an access point. In an ad hoc network, the BSSID is randomly generated and a Universal/Local bit is configured to 1.

SSID:

An identifier (0 to 32 bytes) greater than a common 48-bit identifier

Figure 21:
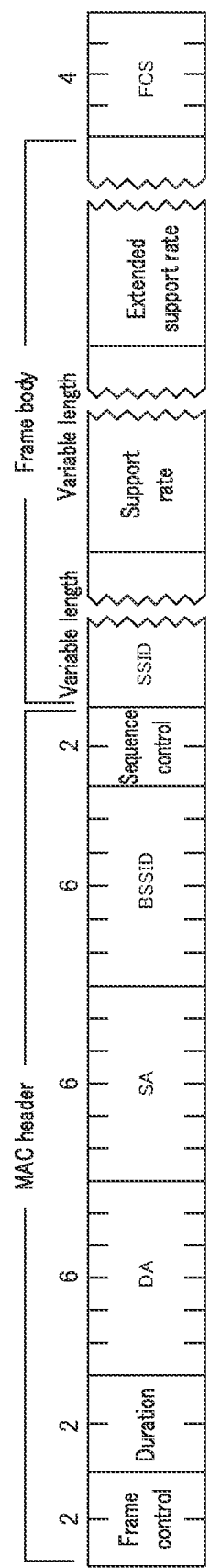
FIG. 21 illustrates an exemplary configuration of a Probe request frame.

A description will be given below of an example of a MAC frame. FIG. 21 illustrates an exemplary configuration of a Probe request frame. The numerical values in FIG. 21 indicate the data lengths of the fields described below, and the unit is byte. The Probe request frame includes, for example, the following fields.

2-byte frame control (field)
2-byte duration (field)
6-byte Destination Address (DA) (field)
6-byte Source Address (SA) (field)
6-byte BSSID (field)
2-byte sequence control (field)

These fields constitute the MAC header. In addition, the Probe request frame also includes the following fields.

Variable-length SSID (field)
Variable-length support rate (field)

These fields are the frame body. The Probe request frame also includes the following field.

4-byte FCS (field)

Note that, in general, in the Probe request frame transmitted by a terminal, "DA" is the MAC address of an AP, "SA" and "BSSID" are included in the MAC address of the terminal. In general, "SSID" is an SSID of the AP.

Figure 22:
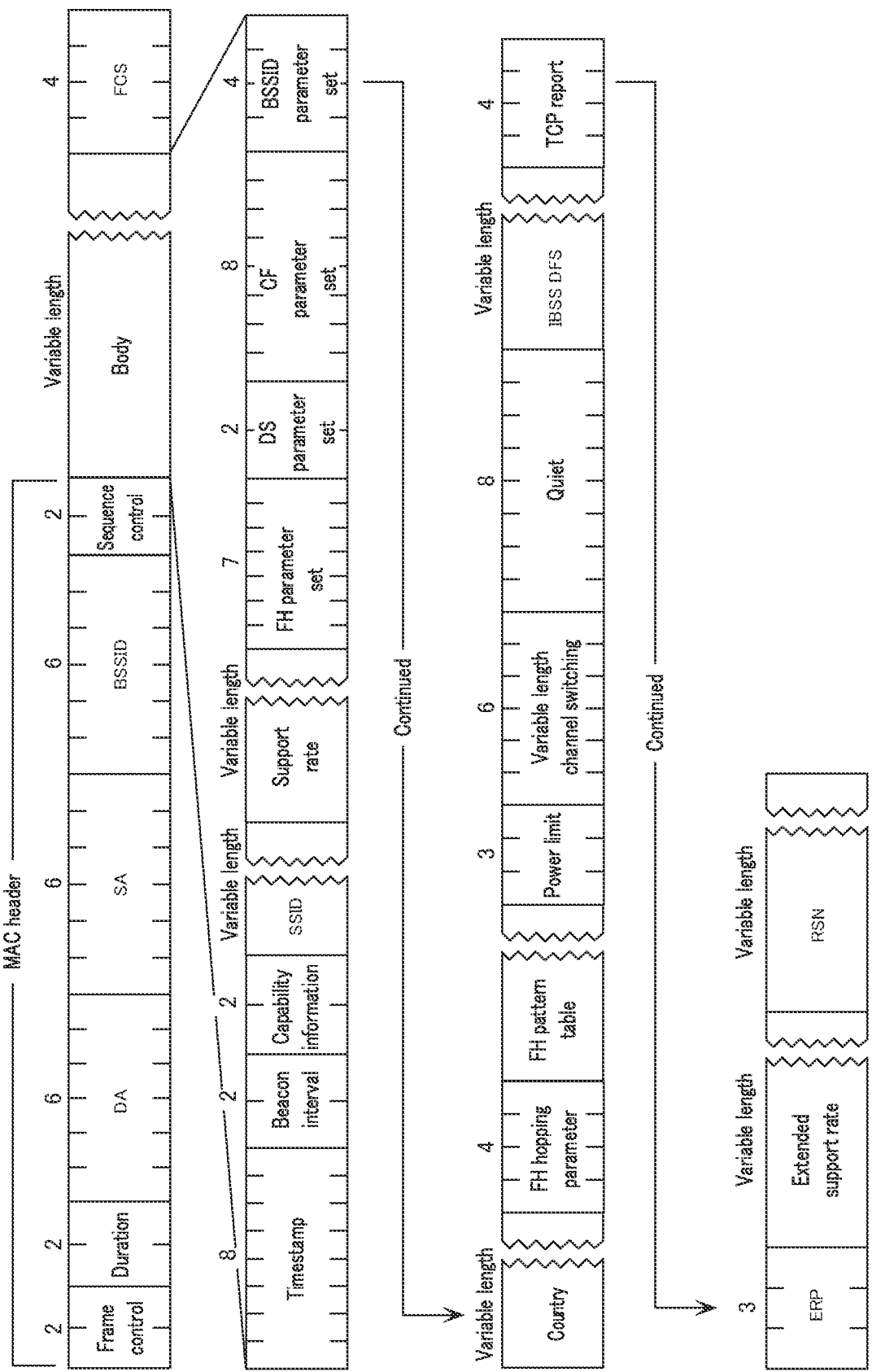
FIG. 22 illustrates an exemplary configuration of a Probe response frame.

FIG. 22 illustrates an exemplary configuration of a Probe response frame. The numerical values in FIG. 22 indicate the data lengths of the fields described below, and the unit is byte. The Probe response frame includes, for example, the following fields.

2-byte frame control (field)
2-byte duration (field)
6-byte Destination Address (DA) (field)
6-byte Source Address (SA) (field)
6-byte BSSID (field)
2-byte sequence control (field)

These fields constitute the MAC header. In addition, the Probe response frame also includes the following fields.

Variable-length body (field)
4-byte Frame Check Sequence (FCS) (field)
8-byte timestamp (field)
2-byte beacon interval (field)
2-byte Capability Information (field)
Variable-length SSID (field)
7-byte Frequency Hopping (FH) parameter set (field)
2-byte Direct Sequence (DS) parameter set field)
8-byte Contention Free (CF) parameter set (field)
4-byte BSSID parameter set (field)
Variable-length country (field)
4-byte FH hopping parameter (field)
FH pattern table (field)
3-byte power limit (field)
6-byte variable-length channel switching (field)
8-byte quiet (field)
Variable-length IBSS DFS (field)
4-byte Transmit Power Control (TPC) report (field)
Variable-length Effective Radiated Power (ERP) (field)
Variable-length extended support rate (field)
Variable-length Robust Security Network (RSN) (field)

Note that, in general, in the Probe response frame transmitted by an AP, "DA" is the MAC address of a terminal, "SA" and "BSSID" are included in the MAC address of the AP. In general, "SSID" is an SSID of the AP.

Figure 23:
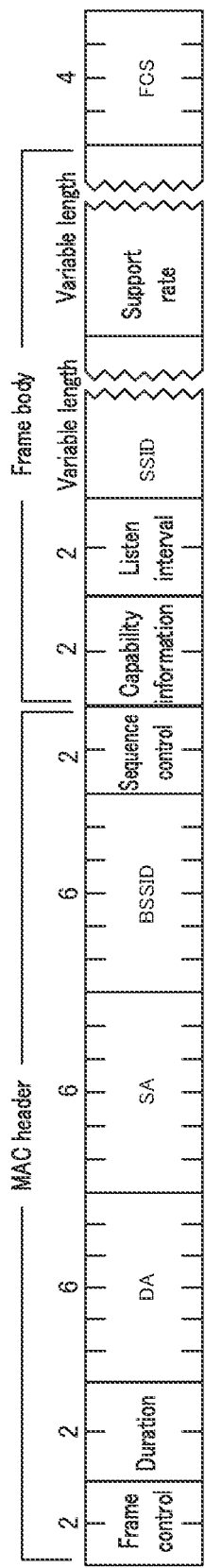
FIG. 23 illustrates an exemplary configuration of an Association request frame.

FIG. 23 illustrates an exemplary configuration of an Association request frame. The numerical values in FIG. 23 indicate the data lengths of the fields described below, and the unit is byte. The Association request frame includes, for example, the following fields.

2-byte frame control (field)
2-byte duration (field)
6-byte Destination Address (DA) (field)
6-byte Source Address (SA) (field)
6-byte BSSID (field)
2-byte sequence control (field)

These fields constitute the MAC header. In addition, the Association request frame also includes the following fields.

2-byte Capability Information (field)
2-byte listen interval (field)
Variable-length SSID (field)
Variable-length support rate (field)

These fields are the frame body. Further, the Association request frame also includes the following field.

4-byte FCS (field)

Figure 24:
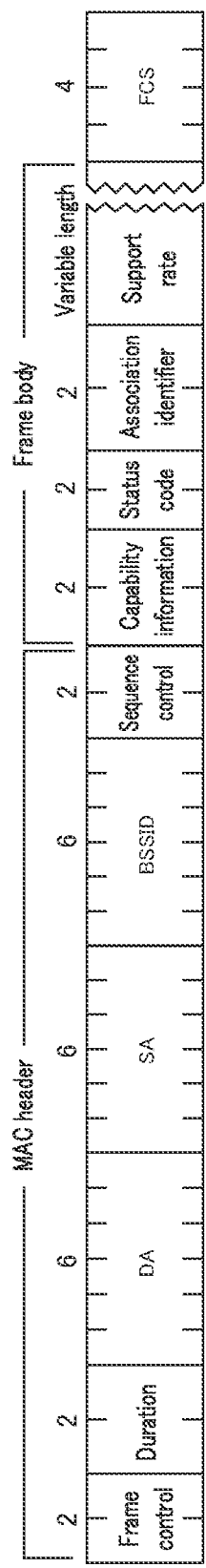
FIG. 24 illustrates an exemplary configuration of an Association response frame.

Note that, in general, in the Association request frame transmitted by a terminal, "DA" is the MAC address of an AP, "SA" and "BSSID" constitute the MAC address of the terminal. In general, "SSID" is an SSID of the AR FIG. 24 illustrates an exemplary configuration of an Association response frame.

The numerical values in FIG. 24 indicate the data lengths of the fields described below, and the unit is byte. The Association response frame includes, for example, the following fields.

2-byte frame control (field)
2-byte duration (field)
6-byte Destination Address (DA) (field)
6-byte Source Address (SA) (field)
6-byte BSSID (field)
2-byte sequence control (field)

These fields constitute the MAC header. In addition, the Association response frame also includes the following fields.

2-byte Capability Information (field)
2-byte status code (field)
2-byte association identifier (field)
Variable-length support rate (field)

These fields are the frame body. In addition, the Association response frame also includes the following field.

4-byte FCS (field)

Note that, in general, in the Association response frame transmitted by an AP, "DA" is the MAC address of a terminal, "SA" and "BSSID" are included in the MAC address of the AP.

In FIG. 10, transmission/reception apparatus 102_1 transmission/reception apparatus 102_2, and transmission/reception apparatus 102_3 may be referred to as a communicator. Alternatively, transmission/reception apparatus 102_1, transmission/reception apparatus 102_2, transmission/reception apparatus 102_3, transmission data processor 107, and received data processor 108 may be referred to as the communicator.

In FIG. 12, transmission/reception apparatus 102_1 and transmission/reception apparatus 102_2 may be referred to as the communicator. Alternatively, transmission/reception apparatus 102_1, transmission/reception apparatus 102_2, transmission data processor 107, and received data processor 108 may be referred to as the communicator.

When the communication apparatuses illustrated in FIGS. 10 and 11 are the AP, controller 111 configures information on at least one of the multiple bands and the multiple channels in the MBMC field of the beacon frame. The communicator transmits, to the terminal by radio, the beacon frame in which the information is configured in the MBMC field by controller 111.

When the communication apparatuses illustrated in FIGS. 10 and 11 are the terminal, the communicator receives the beacon frame in which the information on at least one of the multiple bands and the multiple channels is configured in the MBMC field of the beacon frame. Controller 111 performs communication based on at least one of the multiple bands and the multiple channels based on the information configured in the beacon frame.

In the above embodiments, the expression "section" used for the components may be replaced with another expression such as "circuit (circuitry)," "device," "unit," or "module."

Although the embodiments have been described above with reference to the drawings, the present disclosure is not limited to these examples. Obviously, a person skilled in the art would arrive variations and modification examples within a scope described in claims. It is understood that these variations and modifications are within the technical scope of the present disclosure. Moreover, any combination of features of the above-mentioned embodiments may be made without departing from the spirit of the disclosure.

Supplement 1

It is needless to say that the embodiments described in the present specification may be implemented while combined with a plurality of other contents.

Further, the embodiments and other contents are mere examples. For example, even though the "modulation scheme, error correction coding scheme (error correction code, code length, coding rate, and the like for use), control information, and the like" are illustrated as the examples, it is possible to implement the present disclosure with a similar configuration even when a "modulation scheme, error correction coding scheme (error correction code, code length, coding rate, and the like for use), control information, and the like" different from those in the examples are applied.

Regarding the modulation scheme, the embodiments and other contents described in the present specification can be performed also by using modulation schemes described below. For example, Amplitude Phase Shift Keying (APSK) (e.g., 16APSK, 64APSK, 128APSK, 256APSK, 1024APSK, 4096APSK), Pulse Amplitude Modulation (RAM) (e.g., 4PAM. 8PAM, 16PAM, 64PAM, 128PAM, 256PAM, 1024PAM, 4096PAM), Phase Shift Keying (PSK) (e.g., BPSK, QPSK, 8PSK, 16PSK, 64PSK, 128PSK, 256PSK, 1024PSK, 4096PSK), Quadrature Amplitude Modulation (QAM) 4QAM, 8QAM, 16QAM, 64QAM, 128QAM, 256QAM, 1024QAM, 4096QAM), or the like may be applied, or uniform mapping and non-uniform mapping may be applied for each of the modulation schemes.

In addition, the method of arranging signal points (e.g., 2, 4, 8, 16, 64, 128, 256, or 1024 signal points) on the I-Q plane (modulation scheme with 2, 4, 8, 16, 64, 128, 256, or 1024 signal points or other number of signal points) is not particularly limited in the present specification. Therefore, the function of outputting an in-phase component and a quadrature component based on a plurality of bits is a function in a mapper, and performing precoding and phase changing after the outputting function is one of the effective functions of the present disclosure.

In addition, when "$\forall$" and "$\exists$" are present in the present specification, "$\forall$" represents an universal quantifier, and "$\exists$" represents an existential quantifier.

Further, when the present specification describes a complex plane, the unit of phase, such as, e.g., an argument, is "radian."

The use of the complex plane allows representation of complex numbers in polar form as a representation of the complex numbers using polar coordinates. Letting a point (a, b) on the complex plane correspond to a complex number $z=a+jb$ (where both of "a" and "b" are real numbers and "j" is an imaginary unit), $a=r\times\cos\theta$ and $b=r\times\sin\theta$ hold true when this point is expressed as [r, θ] with the polar coordinates. The character "r" is given by the following equation.

$$r=\sqrt{a^2+b^2} \qquad \text{(Equation 1)}$$

The character "r" is the absolute value of $z(r=|z|)$ and θ is the argument. Then, $z=a+jb$ is expressed as $r\times e^{j\theta}$.

In the present specification, the terminal may have a configuration in which a reception apparatus and the antenna of the terminal are separate from each other. For example, the reception apparatus includes an interface for inputting a signal received by the antenna or a signal received by the antenna and subjected to frequency conversion through a cable, and the reception apparatus performs subsequent processing. Further, the data and information obtained by the reception apparatus are then converted into a video and sound, and displayed on a display (monitor), or outputted from a speaker in the case of sound. Further, the data and information obtained by the reception apparatus may be subjected to signal processing relevant to the video and sound (such signal processing does not have to be performed), and outputted from an RCA terminal (a video terminal and a sound terminal), Universal Serial Bus (USB), High-Definition Multimedia Interface (HDMI) (registered trademark), digital terminal, or the like provided in the reception apparatus.

It is contemplated herein that the transmission apparatus and/or transmitter is included by, for example, a broadcasting station, base station, access point, terminal, mobile phone, smartphone, tablet, laptop PC, server, PC, personal computer, television, home appliance (household electrical machinery equipment), factory apparatus, communication equipment/broadcasting equipment such as Internet of Things (IoT) equipment or the like, repeater, node, bicycle, motorcycle, ship, satellite, airplane, drone, mobile equipment, or robot. Meanwhile, it is contemplated that the reception apparatus and/or receiver is included by a radio, terminal, personal computer, mobile phone, access point, communication equipment such as a base station and the like, smartphone, tablet, laptop PC, server, PC, personal computer, television, home appliance (household electrical machinery equipment), factory apparatus, communication equipment/broadcasting equipment such as Internet of Things (IoT) equipment and the like, and g Node B (gNB), repeater, node, car, bicycle, motorcycle, ship, satellite, airplane, drone, mobile equipment, robot, or the like. Further, it is considered that the transmission apparatus and the reception apparatus in the present disclosure are devices having a communication function, and the devices are configured to be capable of being connected via some interface to an apparatus for executing an application of a television, a radio, a personal computer, a mobile phone, or the like. Further, it is considered that the communication apparatus in the present specification is included by, for example, a broadcasting station, base station, access point, terminal, mobile phone, smartphone, tablet, laptop PC, server, PC, personal computer, television, home appliance (household electrical machinery equipment), factory apparatus, communication equipment/broadcasting equipment such as an Internet of Things (IoT) equipment and the like, g Node B (gNB), repeater, node, car, bicycle, motorcycle, ship, satellite, airplane, drone, mobile equipment, or robot.

In addition, symbols other than a data symbol (for example, a reference signal (preamble, unique word, postamble, reference symbol, pilot symbol, pilot signal, and the like), a control information symbol, a sector sweep, and the like) may be mapped in any manner in a frame in the present embodiments.

It is contemplated that the reference signal is, for example, a known symbol modulated using PSK modulation by the transmitter and receiver (alternatively, the receiver may be capable of knowing a symbol transmitted by the transmitter by synchronization by the receiver), a non-zero power signal, a zero power signal, a known signal known to the transmission reception apparatus, or the like. The receiver performs frequency synchronization, time synchronization, channel estimation (estimation of Channel State Information (CSI)) (for each modulated signal), detection of a signal, estimation of a reception state, estimation of a transmission state, or the like using these signals.

Further, the control information symbol is a symbol for transmitting information (e.g., a modulation scheme, an error correction coding scheme, and a coding rate of the error correction coding scheme; configuration information in a higher layer; a Modulation and Coding Scheme (MCS); a frame configuration; channel information; information on a frequency hand used; information on the number of channels used; and the like used for communication) that needs to be transmitted to a communication partner for achieving communication (of an application or the like) other than communication of data.

The transmission apparatus and/or reception apparatus may need to be notified of a transmission method (MIMO, SISO, space-time block code, interleaving scheme, and MCS), modulation scheme, and error correction coding scheme. This description may be omitted in some of the embodiments.

Regarding both a transmission antenna of the transmission apparatus and a reception antenna of the reception apparatus, a single antenna illustrated in the figures may be composed of one antenna or a plurality of antennas.

Further, the explanation of the embodiments and the like may describe the transmission antenna and the reception antenna separately, However, a configuration of "transmission/reception antenna" serving as both of the transmission antenna and the reception antenna may be used.

In addition, the transmission antenna, reception antenna, and transmission/reception antenna may be referred to, for example, as "antenna port."

The antenna port may be a logical antenna (antenna group) composed of one or more physical antennas. That is, the antenna port does not necessarily refer to one physical antenna, but may refer to an array antenna or the like composed of a plurality of antennas. For example, the number of physical antennas constituting the antenna port is not specified, but the number of physical antennas may be specified as the minimum unit in which a terminal station is capable of transmitting a reference signal. Further, the antenna port may also be specified as a unit or a minimum unit for multiplication by a precoding vector or a weight of a precoding matrix.

In the present specification, a single carrier system may be used. Examples of the single carrier system include "Discrete Fourier Transform (DFT)-Spread Orthogonal Frequency Division Multiplexing (OFDM)" (DFT-S OFDM), "Trajectory Constrained DFT-Spread OFDM," "Constrained DFT-Spread OFDM" (Constrained DFT-S OFDM), "OFDM based Single Carrier (SC)," "Single Carrier (SC)-Frequency Division Multiple Access (FDMA), "Guard interval DFT-Spread OFDM," time-domain implementation single carrier system (e.g., Single Carrier (SC)-QAM), and the like.

In the present specification, a server may provide an application related to processing relevant to the reception apparatus and the receiver, and the terminal may implement the functions of the reception apparatus described in the present specification by installation of this application. Note that the application may be provided to the terminal by connection of a communication apparatus including the transmission apparatus described in the present specification to the server via a network, or the application may be provided to the terminal by connection of a communication apparatus having another transmission function to the server via the network.

Likewise, in the present specification, a server may provide an application related to processing relevant to the transmission apparatus and the transmitter, and the communication apparatus may implement the functions of the transmission apparatus described in the present specification by installation of this application. Note that a method can be envisaged in which this communication apparatus is provided with the application by connection of another communication apparatus to the server via the network.

Note that the present disclosure is not limited to each of the embodiments, and can be implemented with various modifications. For example, each of the embodiments has been described in which the present disclosure is implemented as the communication apparatus, but the present disclosure is not limited to this, and the communication method can be implemented as software.

Note that a program for executing the above communication method, for example, may be stored in a Read Only Memory (ROM) in advance, and the program may be operated by a CPU.

Alternatively, a computer may be operated in accordance with the program for executing the above-described communication method, which is stored in a computer-readable storage medium and recorded in a Random Access Memory (RAM) of the computer.

In addition, the configurations of each of the above-described embodiments may typically be implemented as a Large Scale Integration (LSI) that is an integrated circuit. These configurations may be individually formed into single chips, or may be formed into one chip to include all or some of the configurations of each of the embodiments. While the designation of "LSI" is used herein, the LSI may be referred to as an Integrated Circuit (IC), a system LSI, a super LSI, or an ultra. LSI depending on a difference in the degree of integration. In addition, the technique of circuit integration is not limited to the LSI, and it may be realized by a dedicated circuit or a general-purpose processor. A FPGA (Field Programmable Gate Array) that can be programmed after the manufacture of the LSI or a reconfigurable processor in which the connections and the settings of circuit cells disposed inside the LSI can be reconfigured may be used.

Note that at least one of the FPGA and the CPU may be configured to be capable of entirely or partially downloading, by radio communication or wired communication, software required for implementing the communication method described in the present disclosure. Further, at least one of the FPGA and the CPU may be configured to be capable of entirely or partially downloading software for update through radio communication or wired communication. In addition, digital signal processing described with respect to the present disclosure may be executed by storing the downloaded software in a storage section and operating at least one of the FPGA and the CPU based on the downloaded software stored in the storage section.

At this time, a device including at least one of the FPGA and the CPU may be connected to a communication modem by radio or by wire, and the communication method described in the present disclosure may be implemented by the device and the communication modem.

For example, the communication apparatus such as the base station, the AP, or the terminal described in the present specification may include at least one of the FPGA and the CPU, and the communication apparatus may include an interface for externally acquiring software for operating at least one of the FPGA and the CPU. Further, the communication apparatus may include the storage section for storing the externally acquired software, and the signal processing described in the present disclosure may be realized by operating the FPGA or the CPU based on the stored software.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra. LSI depending on a difference in the degree of integration.

However, the technique of implementing an integrated circuit is not limited to the LSI and may be realized by using a dedicated circuit, a general-purpose processor, or a special-purpose processor. Further, an FPGA that can be programmed after LSI fabrication or a reconfigurable processor that can reconfigure connections and settings of circuit cells inside the LSI may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

The beacon signal may be used as follows. A first communication apparatus may transmit the beacon signal and a second communication apparatus different from the first communication apparatus may receive the beacon signal to perform Listen before Talk (LBT). In this case, the beacon signal may be referred to as a signal for performing LBT.

Summary of Disclosure

A communication apparatus according to the present disclosure includes: a controller that configures information on at least one of multiple bands and multiple channels in an extension field of a beacon signal; and a communicator that transmits the beacon signal.

In the communication apparatus according to the present disclosure, the beacon signal may be transmitted using a first frequency band and a second frequency band.

In the communication apparatus according to the present disclosure, the controller may configure a common Service Set Identifier (SSID) in the extension field in the beacon signal of the first frequency band and in the extension field in the beacon signal of the second frequency band.

In the communication apparatus according to the present disclosure, the controller may configure a common Media Access Control (MAC) address or a common Basic Service Set Identifier (BSSID) in the extension field in the beacon signal of the first frequency band and in the extension field in the beacon signal of the second frequency band.

In the communication apparatus according to the present disclosure, the controller may configure, in the extension field, information on whether or not communication based on the at least one of the multiple bands and the multiple channels is available.

In the communication apparatus according to the present disclosure, the controller may configure, in the extension field, at least one of information on a frequency band available for multi-band communication and information on a frequency band available for multi-channel communication.

In the communication apparatus according to the present disclosure, the controller configures an SSID or a BSSID for multi-band communication capability in the extension field.

A communication apparatus according to the present disclosure includes: a communicator that receives a beacon signal in which information on at least one of multiple bands and multiple channels is configured in an extension field of the beacon signal; and a controller that performs communication based on the information, the communication being based on the at least one of the multiple bands and the multiple channels.

A communication method for a communication apparatus according to the present disclosure includes: configuring information on at least one of multiple bands and multiple channels in an extension field of a beacon signal; and transmitting the beacon signal.

A communication method for a communication apparatus according to the present disclosure includes: receiving a beacon signal in which information on at least one of multiple bands and multiple channels is configured in an extension field of the beacon signal; and performing communication based on the information, the communication being based on the at least one of the multiple bands and the multiple channels.

The disclosure of Japanese Patent Application No. 2019.462963 dated Sep. 6, 2019 including the specification, drawings and abstract is incorporated herein by reference in its entirety.

INDUSTRIAL APPLICABILITY

The present disclosure is useful in radio communication systems of wireless LANs.

REFERENCE SIGNS LIST 1a, 1b AP
2a to 2c Terminal

The invention claimed is:

1. A communication apparatus, comprising:
a controller circuit, which, in operation, configures information on at least one of multiple bands and multiple channels in an extension field of a beacon signal; and
a communicator circuit, which, in operation, transmits the beacon signal using a first frequency band and a second frequency band, wherein
the controller circuit configures a common Media Access Control (MAC) address or a common Basic Service Set Identifier (BSSID) in the extension field in the beacon signal of the first frequency band and in the extension field in the beacon signal of the second frequency band.

2. The communication apparatus according to claim 1, wherein
the controller circuit configures a common Service Set Identifier (SSID) in the extension field in the beacon signal of the first frequency band and in the extension field in the beacon signal of the second frequency band.

3. The communication apparatus according to claim 1, wherein
the controller circuit configures, in the extension field, information on whether or not communication based on the at least one of the multiple bands and the multiple channels is available.

4. The communication apparatus according to claim 1, wherein
the controller circuit configures, in the extension field, at least one of information on a frequency band available for multi-band communication and information on a frequency band available for multi-channel communication.

5. The communication apparatus according to claim 1, wherein
the controller circuit configures a Service Set Identifier (SSID) or a BSSID for multi-band communication capability in the extension field.

6. A communication apparatus, comprising:
a communicator circuit, which, in operation, receives a beacon signal in which information on at least one of multiple bands and multiple channels is configured in an extension field of the beacon signal; and
a controller circuit, which, in operation, performs communication based on the information, the communication being based on the at least one of the multiple bands and the multiple channels, wherein
a common Media Access Control (MAC) address or a common Basic Service Set Identifier (BSSID) is configured in the extension field in the beacon signal of a first frequency band and in the extension field in the beacon signal of a second frequency band.

7. A communication method for a communication apparatus, the communication method comprising:
configuring information on at least one of multiple bands and multiple channels in an extension field of a beacon signal;
transmitting the beacon signal using a first frequency band and a second frequency band; and
configuring a common Media Access Control (MAC) address or a common Basic Service Set Identifier (BSSID) in the extension field in the beacon signal of the first frequency band and in the extension field in the beacon signal of the second frequency band.

8. A communication method for a communication apparatus, the communication method comprising:
receiving a beacon signal in which information on at least one of multiple bands and multiple channels is configured in an extension field of the beacon signal; and
performing communication based on the information, the communication being based on the at least one of the multiple bands and the multiple channels, wherein
a common Media Access Control (MAC) address or a common Basic Service Set Identifier (BSSID) is configured in the extension field in the beacon signal of a first frequency band and in the extension field in the beacon signal of a second frequency band.

* * * * *